United States Patent
Schlichting et al.

(10) Patent No.: US 8,906,270 B2
(45) Date of Patent: Dec. 9, 2014

(54) ACIDIC ION EXCHANGE MEMBRANE AND METHOD FOR MAKING AND USING THE SAME

(75) Inventors: Gregory J. Schlichting, Golden, CO (US); Andrew M. Herring, Nederland, CO (US)

(73) Assignee: Colorado School of Mines, Golden, CO (US)

( * ) Notice: Subject to any disclaimer, the term of this patent is extended or adjusted under 35 U.S.C. 154(b) by 305 days.

(21) Appl. No.: 13/052,968

(22) Filed: Mar. 21, 2011

(65) Prior Publication Data

US 2011/0227006 A1 Sep. 22, 2011

Related U.S. Application Data

(60) Provisional application No. 61/315,805, filed on Mar. 19, 2010.

(51) Int. Cl.
| | |
|---|---|
| *H01B 1/12* | (2006.01) |
| *H01M 8/10* | (2006.01) |
| *C08J 5/22* | (2006.01) |
| *B01D 71/82* | (2006.01) |
| *C09D 143/02* | (2006.01) |
| *C08L 43/02* | (2006.01) |
| *C08K 3/32* | (2006.01) |
| *B01D 61/42* | (2006.01) |
| *C02F 1/44* | (2006.01) |

(52) U.S. Cl.
CPC ............ *H01B 1/122* (2013.01); *H01M 8/1034* (2013.01); *B01D 2325/26* (2013.01); *B01D 61/42* (2013.01); *H01M 2008/1095* (2013.01); *C08J 5/2231* (2013.01); *B01D 71/82* (2013.01); *C09D 143/02* (2013.01); *C02F 1/44* (2013.01); *B01D 2325/22* (2013.01); *C08L 43/02* (2013.01); *H01M 8/1048* (2013.01); *C08J 2343/02* (2013.01); *Y02E 60/521* (2013.01); *C08K 3/32* (2013.01); *H01M 2300/0082* (2013.01)

USPC ........ 252/519.34; 428/690; 429/483; 429/492

(58) Field of Classification Search
USPC ......... 252/519.34; 429/33, 483, 492; 428/690
See application file for complete search history.

(56) References Cited

U.S. PATENT DOCUMENTS

| | | |
|---|---|---|
| 4,430,207 A | 2/1984 | Kukes |
| 4,434,138 A | 2/1984 | Lee et al. |
| 4,441,992 A | 4/1984 | Kimble |
| 4,450,068 A | 5/1984 | Kukes |
| 4,457,835 A | 7/1984 | Kukes |
| 4,507,402 A | 3/1985 | Kukes |
| 4,555,499 A | 11/1985 | Kukes et al. |
| 4,557,824 A | 12/1985 | Kukes et al. |

(Continued)

OTHER PUBLICATIONS

Alberti et al. "Crystalline Zr(R-PO3)2 and Zr(R-OPO3)2 compounds (R=organic radical): A new class of materials having layered structure of the zirconium phosphate type." Journal of Inorganic and Nuclear Chemistry, 1978, vol. 40, pp. 1113-1117.

(Continued)

*Primary Examiner* — Khanh Tuan Nguyen
(74) *Attorney, Agent, or Firm* — Sheridan Ross, P.C.

(57) ABSTRACT

The invention relates generally to a polymeric composition and a method for making and using the polymeric composition, more specifically to a polymeric composition and a method for making and using the polymeric composition in the form of a membrane.

31 Claims, 19 Drawing Sheets

(56) References Cited

U.S. PATENT DOCUMENTS

| | | | |
|---|---|---|---|
| 4,609,638 A | 9/1986 | Kukes et al. | |
| 4,671,866 A | 6/1987 | Coombs et al. | |
| 4,695,642 A | 9/1987 | Derouane et al. | |
| 4,731,705 A | 3/1988 | Velasco et al. | |
| 4,826,663 A | 5/1989 | Alberti et al. | |
| 4,942,218 A | 7/1990 | Sanderson et al. | |
| 6,528,603 B1 | 3/2003 | Blanchard et al. | |
| 7,108,935 B2 | 9/2006 | Bauer et al. | |
| 7,241,272 B2 | 7/2007 | Karoor et al. | |
| 7,265,379 B2 | 9/2007 | Sandberg et al. | |
| 7,521,141 B2 | 4/2009 | Alberti et al. | |
| 7,556,743 B2 | 7/2009 | Furman et al. | |
| 7,566,432 B2 | 7/2009 | Wong | |
| 2005/0147859 A1* | 7/2005 | Kiefer et al. | 429/33 |
| 2005/0249975 A1* | 11/2005 | Sandberg et al. | 428/690 |
| 2010/0196786 A1* | 8/2010 | Niepceron et al. | 429/483 |

OTHER PUBLICATIONS

Alberti et al. "Preparation and characterisation of alpha-layered zirconium phosphate sulfophenylenphosphonates with variable concentration of sulfonic groups." Solid State Ionics, 2005, vol. 176, pp. 2893-2898.
Alberti et al. "Acid Zirconium-Phosphates and Phosphonates as Proton Conductors and Their Use for Solid-State Gas Sensors." Russian Journal of Electrochemistry, 1993, vol. 29, pp. 1257-1264.
Alberti et al. "Amperometric Sensor for Carbon-Monoxide Based on Solid-State Protonic Conduction." Solid State Ionics, 1993, vol. 61, pp. 241-244.
Alberti et al. "Composite membranes for medium-temperature PEM fuel cells." Annual Review of Materials Research, 2003, vol. 33, pp. 129-154.
Alberti et al. "Determination of the Total Concentration and Speciation of Metal Ions in River, Estuarine and Seawater Samples." Analytical Sciences, Dec. 2008, vol. 24, pp. 1605-1611.
Alberti et al. "Formation of aqueous colloidal dispersions of exfoliated gamma-zirconium phosphate by intercalation of short alkylamines." Langmuir, 2000, vol. 16, pp. 7663-7668.
Alberti et al. "Formation of colloidal dispersions of layered gamma-zirconium phosphate in water/acetone mixtures." Journal of Colloid and Interface Science, 1997, vol. 188, pp. 27-31.
Alberti et al. "Inorganic Ion-Exchange Pellicles Obtained by Delamination of Alpha-Zirconium Phosphate Crystals." Journal of Colloid and Interface Science, Sep. 1985, vol. 107, pp. 256-263.
Alberti et al. "Intercalation processes of n-alkyl monoamines in gamma-zirconium phosphate." Langmuir, 2000, vol. 16, pp. 4165-4170.
Alberti et al. "Layered and pillared metal(IV) phosphates and phosphonates." Advanced Materials, 1996, vol. 8, pp. 291-303.
Alberti et al. "Layered and pillared zirconium phosphate-phosphonates and their inclusion chemistry." Supramolecular Chemistry, 1995, vol. 6, pp. 29-40.
Alberti et al. "Microporous solids based on pillared metal(IV) phosphates and phosphonates." Journal of Porous Materials, 1998, vol. 5, pp. 205-220.
Alberti et al. "Novel Nafion—zirconium phosphate nanocomposite membranes with enhanced stability of proton conductivity at medium temperature and high relative humidity." Electrochimica Acta, 2007, vol. 52, pp. 8125-8132.
Alberti et al. "Potentiometric and Amperometric Gas Sensors Based on the Protonic Conduction of Layered Zirconium—Phosphates and Phosphonates." Sensors and Actuators B-Chemical, 1995, vol. 24, pp. 270-272.
Alberti et al. "Preparation and Characterization of Zirconium—Phosphate Diphosphonates With the Gamma-Structure—A New Class of Covalently Pillared Compounds." Materials Chemistry and Physics, 1993, vol. 35, pp. 187-192.
Alberti et al. "Preparation and Characterization of Zirconium—Phosphate Phosphonates, ZrPO4(H2PO4)1-X(RPO2OH)X.nH2O With Gamma-Layer Structure (R=CH3, C3H7, C6H11)." Inorganic Chemistry, 1993, vol. 32, pp. 4600-4604.
Alberti et al. "Preparation and properties of nafion membranes containing nanoparticles of zirconium phosphate." Desalination, 2006, vol. 199, pp. 280-282.
Alberti et al. "Preparation and proton conductivity of composite ionomeric membranes obtained from gels of amorphous zirconium phosphate sulfophenylenphosphonates in organic solvents." Journal of Materials Chemistry, 2004, vol. 14, pp. 1910-1914.
Alberti et al. "Preparation of Nano-Structrued Polymeric Proton Cunducting Membranes for Use in Fuel Cells" Advanced Membrane Technology, Annals of the New York Academy of Sciences, 2003, vol. 984, pp. 208-225.
Alberti et al. "Proton Conductivity of Zirconium Carboxy Normal-Alkyl Phosphonates With an Alpha-Layered Structure." Solid State Ionics, 1991, vol. 46, pp. 61-68.
Alberti et al. "Protonic Conductivity of Layered Zirconium Phosphonates Containing—SO3H Groups .I. Preparation and Characterization of a Mixed Zirconium Phosphonate of Composition ZR(O3PR)0.73(O3P'1.27.NH2O, With R=-C6H4-SO3H and R'=-CH2-OH." Solid State Ionics, 1992, vol. 50, pp. 315-322.
Alberti et al. "Protonic conductivity of layered zirconium phosphonates containing—SO3H groups .III. Preparation and characterization of gamma—zirconium sulfoaryl phosphonates." Solid State Ionics, 1996, vol. 84, pp. 97-104.
Alberti et al. "Protonic Conductivity of Layered Zirconium Phosphonates Containing—SO3H Groups .II. AC Conductivity of Zirconium Alkyl Sulfophenyl Phosphonates in the Range 100- 200-Degrees-C, in the Presence or Absence of Water-Vapor." Solid State Ionics, 1992, vol. 58, pp. 339-344.
Alberti et al. "Use of Solid-State Protonic Conductors for Oxygen Potentiometric Sensor At Room-Temperature." Solid State Ionics, 1991, vol. 46, pp. 183-186.
Barbir et al. "Status and development of PEM fuel cell technology." International Journal of Energy Research, 2008, vol. 32, pp. 369-378.
Bauer et al. "Comparison between Nafion (R) and a Nafion (R) zirconium phosphate nano-composite in fuel cell applications." Fuel Cells, 2006, vol. 6, pp. 261-269.
Bingol et al. "Copolymers and hydrogels based on vinylphosphonic acid." Macromolecules, 2008, vol. 41, pp. 2785-2790.
Bingol et al. "Synthesis, microstructure, and acidity of poly (vinylphosphonic acid)." Macromolecular Rapid Communications, 2006, vol. 27, pp. 1719-1724.
Bonnet et al. "Hybrid organic-inorganic membranes for a medium temperature fuel cell." Journal of New Materials for Electrochemical Systems, 2000, vol. 3, pp. 87-92.
Burkett et al. "Covalently linked nanocomposites: Poly(methyl methacrylate) brushes grafted from zirconium phosphonate." Chemistry of Materials, 2006, vol. 18, pp. 5137-5143.
Cabeza et al. "From non-porous crystalline to amorphous microporous metal(IV) bisphosphonates." Microporous and Mesoporous Materials, 2008, vol. 114, pp. 322-336.
Casciola et al. "Nanocomposite membranes made of zirconium phosphate sulfophenylenphosphonate dispersed in polyvinylidene fluoride: Preparation and proton conductivity." Solid State Ionics, 2005, vol. 176, pp. 2985-2989.
Casciola et al. "Gels of zirconium phosphate in organic solvents and their use for the preparation of polymeric nanocomposites." Journal of Materials Chemistry, 2005, vol. 15, pp. 4262-4267.
Casciola et al. "On the decay of Nafion proton conductivity at high temperature and relative humidity." Journal of Power Sources, 2006, vol. 162, pp. 141-145.
Clearfield "Coordination chemistry of phosphonic acids with special relevance to rare earths." Journal of Alloys and Compounds, 2006, vol. 418, pp. 128-138.
Clearfield "Metal Phosphonate Chemistry." Progress in Inorganic Chemistry, John Wiley & Sons Inc, 1998, vol. 47, pp. 371-510.
Clearfield "Recent advances in metal phosphonate chemistry II" Current Opinion in Solid State & Materials Science, 2002, vol. 6, p. 495-506.
Clearfield "Recent advances in metal phosphonate chemistry." Current Opinion in Solid State & Materials Science, 1996, vol. 1, No. 2, pp. 268-278.

(56) References Cited

OTHER PUBLICATIONS

Clearfield "Ion-Exchange and Adsorption in Layered Phosphates." Materials Chemistry and Physics, 1993, vol. 35, pp. 257-263.
Clearfield "Unconventional metal organic frameworks: porous crosslinked phosphonates." Dalton Transactions, 2008, pp. 6089-6102.
Clearfield et al. "Polyether and Polyimine Derivatives of Layered Zirconium—Phosphates As Supramolecules." Acs Symposium Series, Chapter 14, Jul. 1992, vol. 499, pp. 178-193.
Clearfield et al. "Synthesis and Stability of Mixed-Ligand Zirconium Phosphonate Layered Compounds." Journal of Solid State Chemistry, 1995, vol. 117, pp. 275-289.
Crabtree et al. "The hydrogen fuel alternative." MRS Bulletin, Apr. 2008, vol. 33, pp. 421-428.
Devanathan "Recent developments in proton exchange membranes for fuel cells." Energy & Environmental Science, 2008, vol. 1, pp. 101-119.
Dippel et al. "Proton conductivity in fused phosphoric acid; A 1H/31P PFG-NMR and QNS study." Solid State Ionics, 1993, vol. 61, pp. 41-46.
Gubler et al. "Celtec-V: A Polybenzimidazole-Based Membrane for the Direct Methanol Fuel Cell." Journal of the Electrochemical Society, 2007, vol. 154, No. 9, pp. B981-987 (Abstract Only).
Herring "Inorganic-Polymer Composite Membranes for Proton Exchange Membrane Fuel Cells." Journal of Macromolecular Science, Part C: Polymer Reviews, 2006, vol. 46, pp. 245-296 (Abstract Only).
Huang et al. "Sulfonated poly(ether ether ketone)/zirconium tricarboxybutylphosphonate composite proton-exchange membranes for direct methanol fuel cells." Acta Polymerica Sinica, Apr. 2007, pp. 337-342.
Jiang et al. "Influence of temperature and relative humidity on performance and CO tolerance of PEM fuel cells with Nafion (R)-Teflon (R)—Zr(HPO4)(2)." Electrochimica Acta, 2006, vol. 51, pp. 5596-5605.
Kaltbeitzel et al. "Water sorption of poly(vinylphosphonic acid) and its influence on proton conductivity." Solid State Ionics, 2007, vol. 178, pp. 469-474.
Kim et al. "Nafion/ZrSPP composite membrane for high temperature operation of proton exchange membrane fuel cells." Current Applied Physics, 2006, vol. 6, pp. 612-615.
Komber et al. "H-1, C-13, and P-31 NMR study on poly(vinylphosphonic acid) and its dimethyl ester." Macromolecules, 2008, vol. 41, pp. 2119-2125.
Kreuer et al. "Investigation of proton-conducting solids." Solid State Ionics, 1981, vol. 3/4, pp. 353-358.
Kreuer et al. "Vehicle Mechanism, a New Model for the Interpretation of the Conductivity of Fast Proton Conductors." Angewandte Chemie-International Edition in English, 1982, vol. 21, pp. 208-209.
Lee et al. "High-resolution solid-state NMR studies of poly(vinyl phosphonic acid) proton-conducting polymer: Molecular structure and proton dynamics." Journal of Physical Chemistry B, 2007, vol. 111, pp. 9711-9721.
Ma et al. "Novel organosoluble filiform zirconium phosphonates with a layered mesoporous backbone." Journal of Materials Chemistry, 2009, vol. 19, pp. 1098-1104.
Millaruelo et al. "Synthesis of vinylphosphonic acid anhydrides and their copolymerization with vinylphosphonic acid." Macromolecular Chemistry and Physics, 2008, vol. 209, pp. 366-374.
Pesavento et al. "Analytical methods for determination of free metal ion concentration, labile species fraction and metal complexation capacity of environmental waters: A review." Analytica Chimica Acta, 2009, vol. 631, pp. 129-141.
Rivas et al. "Metal ion binding capability of the water-soluble poly-(vinyl phosphonic acid) for mono-, di-, and trivalent cations." Journal of Applied Polymer Science, 2004, vol. 92, pp. 2917-2922.
Schmittinger et al. "A review of the main parameters influencing long-term performance and durability of PEM fuel cells." Journal of Power Sources, 2008, vol. 180, pp. 1-14.
Segawa et al. "Molecular Design of Layered Zirconium Phosphonates for Fuel Cell Applications." Studies in Surface Science and Catalysis, 2004, vol. 154, pp. 1096-1102.
Shao et al. "Proton exchange membrane fuel cell from low temperature to high temperature: Material challenges." Journal of Power Sources, 2007, vol. 167, pp. 235-242.
Sogaard et al. "Preparation and analysis of new proton conducting membranes for fuel cells." Solid State Ionics, 2007, vol. 178, pp. 493-500.
Souzy et al. "Functional fluropolymers for fuel cell membranes." Solid State Ionics, 2005, vol. 176, pp. 2839-2848.
Steininger et al. "Intermediate temperature proton conductors for PEM fuel cells based on phosphonic acid as protogenic group: A progress report." Physical Chemistry Chemical Physics, 2007, vol. 9, pp. 1764-1773.
Sui et al. "Preparation and properties of solid acid zirconium oligo(sulfostyrenyl) phosphonate hydrogen phosphate supported on $TiO_2$." Materials Letters, 2005, vol. 59, pp. 2115-2119.
Tsai et al. "Synthesis and properties of epoxy/layered zirconium phosphonate (Zr—P) nanocomposites." Journal of Physics and Chemistry of Solids, 2008, vol. 69, pp. 1379-1382.
Wagner et al. "Vinylphosphonic Acid Homo- and Block Copolymers." Macromolecular Chemistry and Physics, 2009, vol. 210, pp. 1903-1914.
Vaivars et al. "Proton-conducting zirconium phosphate/poly(vinyl acetate)/glycerine gel electrolytes." Journal of Solid State Electrochemistry, 2003, vol. 7, pp. 724-728.
Vivani et al. "New advances in zirconium phosphate and phosphonate chemistry: Structural archetypes." Microporous and Mesoporous Materials, 2008, vol. 107, pp. 58-70.
Wu et al. "A review of PEM fuel cell durability: Degradation mechanisms and mitigation strategies." Journal of Power Sources, 2008, vol. 184, pp. 104-119.
Wu et al. "Synthesis and characterization of poly (styrene-co-vinyl phosphonate) Ionomers." Journal of Polymer Science Part B—Polymer Physics, 2004, vol. 42, pp. 3628-3641.
Zhang et al. "High temperature PEM fuel cells." Journal of Power Sources, 2006, vol. 160, pp. 872-891.
Zhang et al. "Impregnating Zirconium Phosphate onto Porous Polymers for Lead Removal from Waters: Effect of Nanosized Particles and Polymer Chemistry." Industrial & Engineering Chemistry Research, 2009, vol. 48, pp. 4495-4499.
Zhang et al. "PEM fuel cell relative humidity (RH) and its effect on performance at high temperatures." Electrochimica Acta, 2008, vol. 53, pp. 5315-5321.

\* cited by examiner

ACIDIC ION EXCHANGE MEMBRANE AND METHOD FOR MAKING AND USING THE SAME

CROSS REFERENCE TO RELATED APPLICATIONS

The present application claims the benefits of U.S. Provisional Application No. 61/315,805 filed Mar. 19, 2010 entitled "Acidic Ion Exchange Membrane", which is incorporated herein in its entirety by this reference.

STATEMENT REGARDING FEDERALLY SPONSORED RESEARCH AND DEVELOPMENT

The United States Government has a paid-up license in this invention and the right in limited circumstances to require the patent owner to license others on reasonable terms as provided for by the terms of Contract No. DMR-0820518 awarded by the National Science Foundation Renewable Energy Materials Research, Science and Engineering Center.

FIELD OF INVENTION

The invention relates generally to a polymeric composition and a method for making and using the polymeric composition, more specifically to a polymeric composition and a method for making and using the polymeric composition in the form of a membrane.

BACKGROUND OF THE INVENTION

Polymeric membranes in the form of ion exchange membranes are an important component in electrochemical devices, such as fuel cells, batteries, and capacitors. Ionic transport through the membrane at high temperature, low relative humidity or both is the rate-limiting component for most electrochemical devices.

Ion exchange membranes are generally a polymeric material having electrically neutral and ionized repeating units. The ionized repeating units are typically no more than about 50% of the repeating units, and more typically, the ionized repeating units are from about 5% to about 20% of the repeating units of the polymer.

Some ion exchange membranes with solid super-acid repeating units exhibit poor ionic conductivity at high temperature and low relative humidity. Furthermore, the solid super-acid ionized repeating units do not support high temperature ionic conductivity nor do they provide for adequate water uptake. Moreover, super-acid containing ion exchange membranes typically degrade during long operational cycling conditions.

Polyvinyl phosphonic acid polymers are commonly used in electrochemical devices. Polyvinyl phosphonic acid polymers are water-soluble polymers. Moreover, polyvinyl phosphonic acid polymers have a high proton conductivity and high degree of water swelling. This high degree of water swelling and high proton conductivity make the polyvinyl phosphonic acid polymers unsuitable for electrochemical devices containing water.

SUMMARY OF THE INVENTION

These and other needs are addressed by the various embodiments and configurations of the present invention. One embodiment includes a composition having an at least a partially polymerized oxyanion-containing monomer and/or oligomer and a group IV-B metal-containing monomer and/or oligomer. The at least partially polymerized oxyanion-containing monomer and/or oligomer is from about 1 to about 99 weight percent of the composition and/or the group IV-B metal-containing monomer and/or oligomer is from about 99 to about 1 weight percent of the composition. The at least a partially polymerized oxyanion-containing monomer and/or oligomer in its un-polymerized state has one or more oxyanions. The oxyanion contains an element selected from the group of elements consisting of aluminum, silicon, phosphorous, sulfur, gallium, germanium, arsenic, indium, tin, antimony, tellurium, thallium, lead, bismuth and polonium. The at least partially polymerized oxyanion-containing monomer and/or oligomer is selected from the group of polymers consisting of olefin, styrene, vinyl, acrylic, halo-olefin, diene, oxide, esther, acetal, sulfide, thioester, amide, thioamide, urethane, thiourethane, urea, thiourea, imide, thioimide, anhydride, thianhydride, carbonate, thiocarbonate, imine, siloxane, silane, phosphazene, ketone, thioketone, sulfone, sulfoxide, sulfonate, sulfoamide, phylene, and a combination and/or mixture thereof.

The group IV-B metal-containing monomer and/or oligomer may be dispersed in the composition. Preferably, at least some of the group IV-B metal-containing monomer and/or oligomer may be dispersed in the composition. More preferably, at least most of the group IV-B metal-containing monomer and/or oligomer may be dispersed in the composition.

The group IV-B metal-containing monomer and/or oligomer may be in the form of group IV-B metal-containing monomer and/or oligomer agglomerates in composition. Preferably, at least some of the group IV-B metal-containing monomer and/or oligomer may be in the form of group IV-B metal-containing monomer and/or oligomer agglomerates in the composition. More preferably, at least most of the group IV-B metal-containing monomer and/or oligomer may be in the form of group IV-B metal-containing monomer and/or oligomer agglomerates in the composition.

Preferably, the group IV-B metal-containing monomer and/or oligomer comprise a group IV-B metal oxyanion-containing compound formed by chemically reacting an oxyanion-composition with a group IV-B metal-containing compound. Furthermore, at least some group IV-B metal of the group IV-B metal oxyanion-containing compound chemically interacts with at least some oxyanions contained in the at least partially polymerized oxyanion-containing monomer and/or oligomer. More preferably, at least some group IV-B metal of the group IV-B metal-containing monomer and/or oligomer is chemically associated with at least some of the oxygen atoms in the at least partially polymerized oxyanion-containing monomer and/or oligomer.

In a preferred embodiment, the group IV-B metal-containing monomer and/or oligomer comprise zirconium phosphate. In a more preferred embodiment, the zirconium phosphate is formed by reacting vinyl phosphonic acid with zirconyl chloride (that is, oxozirconium (IV) chloride).

In some embodiments, the composition includes vinyl phosphonic acid and zirconium phosphate. Preferably, at least some of the vinyl phosphonic acid is polymerized. More preferably, the zirconium phosphate is from about 15 to about 70 weight percent of the composition and/or the vinyl phosphonic acid is from about 85 to about 30 weight percent of the composition. The zirconium phosphate is preferably a reaction product of vinyl phosphonic acid and zirconyl chloride (that is, oxozirconium (IV) chloride). Furthermore, at least some zirconium of the zirconium phosphate chemically interacts with at least some oxyanions contained in the at least partially polymerized oxyanion-containing monomer and/or oligomer. Even more preferably, at least some zirconium of the zirconium phosphate chemically interacts with one or more oxygen atoms of the oxyanions of the at least partially polymerized oxyanion-containing monomer and/or oligomer.

Preferably, zirconium of the zirconium phosphate substantially chemically interacts with oxygen and/or oxygen atoms of the vinyl phosphonic acid. Furthermore, the zirconium phosphate is substantially dispersed in the composition. Preferably, the composition has at least some amorphous regions. Moreover, some compositions have no more than about 20 weight percent zirconium phosphate contain zirconium phosphate substantially dispersed in the composition. More preferably, the zirconium phosphate is substantially dispersed in amorphous regions of the composition. Even more preferably, at least some of the zirconium phosphate is dispersed in the composition.

In some embodiments, the composition contains zirconium phosphate in the form of crystalline agglomerates. Preferably, compositions having at least about 40 weight percent zirconium phosphate contain at least some of the zirconium phosphate as crystalline agglomerates.

In some embodiments, the composition has a conductivity of at least about 150 mS/cm at about 80 degrees Celsius and about 95% relative humidity. In other embodiments, the composition has a conductivity of at least about 100 mS/cm at about 110 degrees Celsius and 25% relative humidity. Preferably, the composition has a conductivity of about 110 degrees Celsius and a relative humidity of about 25% of at least about 40 mS/cm.

In some embodiments, the composition is thermally stable. Preferably, the composition is thermally stable to at least about 200 degrees Celsius.

In some embodiments, the composition is in the form of a membrane. The membrane is formed from a composition having an at least a partially polymerized oxyanion-containing monomer and/or oligomer and a group IV-B metal-containing monomer and/or oligomer. Preferably, the at least partially polymerized oxyanion-containing monomer is vinyl phosphonic acid and the group IV-B metal-containing monomer and/or oligomer is zirconium phosphate. Preferably, the zirconium phosphate is from about 15 to about 70 weight percent of the membrane and/or the vinyl phosphonic acid is about 85 to about 30 weight percent of the membrane. The membrane is thermally stable to a temperature of at least about 200 degrees Celsius.

The membrane is preferably one or both of substantially clear and substantially flexible. Preferably, the membrane has a conductivity of at least about 1 mS/cm at temperature of at least about 20 degrees Celsius and a relative humidity of about 25%. The zirconium phosphate is one or both of substantially dispersed and in the form of crystalline agglomerates within the membrane.

Another embodiment is a process for making compositions according to embodiments described within this written specification. One process for making the composition includes forming a mixture of vinyl phosphonic acid and zirconium phosphate and polymerizing at least some of the vinyl phosphonic acid in the presence of the zirconium phosphate. The polymerizing includes polymerizing at least some of the vinyl phosphonic acid. In some embodiments, the process further includes chemical interaction between at least some zirconium of the zirconium phosphate with at least some oxygen of the vinyl phosphonic acid.

Preferably, the polymerizing process for the vinyl phosphonic acid is selected from the group of polymerization processes consisting of free radical, anionic, step, cationic, and polymerization. Initiation of the polymerization is by one or both of chemical and photo initiators. The chemical initiator is selected from the group consisting of an organic molecule, a non-metal containing molecule, a metal, a metal-containing molecule, a redox initiator and a combination thereof. The photo initiator is selected from the group consisting of ultra violet light, electron beam, x-ray beam, electro-magnetic energy, thermal energy and a combination thereof.

Another embodiment includes an apparatus containing one or both of the compositions and membranes according to various embodiments contained within this written specification. Preferably, the apparatus includes a membrane having an at least partially polymerized oxyanion-containing monomer and/or oligomer and a group IV-B metal-containing monomer and/or oligomer, the monomer and/or oligomer in its un-polymerized state having one or more oxyanions. The apparatus is selected from the group consisting of a fuel cell, a water or gas purification apparatus, a chemical reactor, an electrodialysis apparatus, an electrochemical cell, an electrode, a sensor, or combination thereof. More preferably, the membrane is one or more of fuel cell membrane, a water or gas purification membrane, a reactive membrane, an electrodialysis membrane, an electrochemical or electrode membrane, a sensor membrane or a combination thereof.

These and other advantages will be apparent from the disclosure of the invention(s) contained herein.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples.

Further features and advantages will become apparent from the following, more detailed, description of the various embodiments of the invention(s), as illustrated by the drawings referenced below.

DETAILED DESCRIPTION OF THE INVENTION

Figure 1:
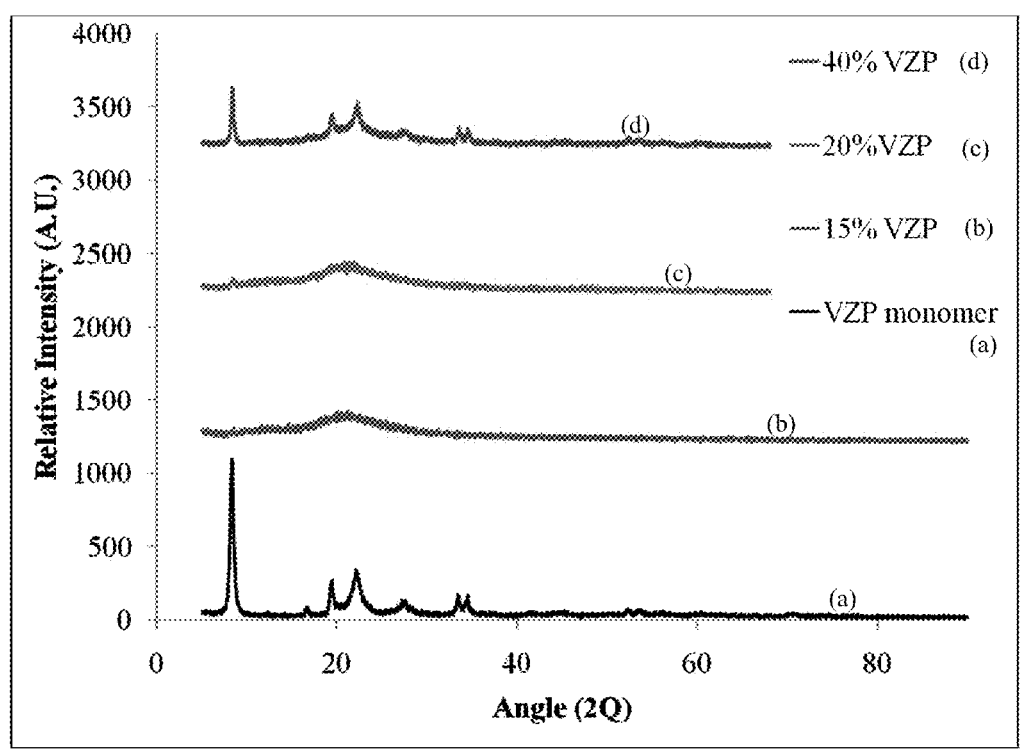
FIG. 1 depicts X-ray diffraction analysis of compositions according to some embodiments.

One aspect of the present invention is a composition having at least some polymerized oxyanion-containing monomer and/or oligomer and a group IV-B metal-containing monomer and/or oligomer. Preferably, the oxyanion-containing monomer and/or oligomer in the un-polymerized state have one or more oxyanions.

As used herein the term oxyanion refers to a chemical compound with a generic formula of $A_xO_y^{z-}$ (where A represents a chemical element other than oxygen and O represents an oxygen atom). "A" can represent a metal, a metalloid, or a non-metal atom. In some embodiments, the oxyanion comprises an oxyanion of aluminum, silicon, phosphorous, sulfur, gallium, germanium, arsenic, selenium, indium, tin, antimony, tellurium, thallium, lead, bismuth, polonium or a mixture thereof. Preferably, the oxyanion comprises a phosphorous-containing oxyanion. Why not wanting to be limited by example, suitable phosphorous-containing oxyanion compounds can include without limitation oxyanions having the generic formula $P_xO_y^{z-}$. Preferably, the phosphate oxyanion has the $P(=O)O_2^{2-}$ structure.

The oxyanion may be protonated, partially protonated or un-pronated. Preferably, the oxyanion is a highly acidic. As used herein a highly acidic oxyanion refers to an oxyanion that readily dissociates a cationic proton, specifically $H^+$. Phosphates and sulfates are non-limiting examples of acidic oxyanions. Preferably, the oxyanion has at least a $pK_a$ value of commonly no more than about 20, more commonly no more than about 15, even more commonly no more than about 5, yet even more commonly no more than about 2, still yet even more commonly no more than about 1, or still yet even more commonly no more than about 0. Highly acidic oxyanions substantially contribute to the ionic conductivity of the composition.

The oxyanion-containing monomer and/or oligomer may comprise in some embodiments, $R-A_xO_y^{z-}$, where R is a polymerizable entity and $A_xO_y^{z-}$ is an oxyanion. The polymerizable entity may comprise one or more of an olefin, styrene, vinyl, acrylic, halo-olefin, diene, oxide, esther, acetal, sulfide, thioester, amide, thioamide, urethane, thiourethane, urea, thiourea, imide, thioimide, anhydride, thianhydride, carbonate, thiocarbonate, imine, siloxane, silane, phosphazene, ketone, thioketone, sulfone, sulfoxide, sulfonate, sulfoamide, phylene, and a combination and/or mixture thereof.

In some embodiments, at least some the oxyanion-containing monomer and/or oligomer is in a polymerized form. Preferably, at least most of the oxyanion-containing monomer and/or oligomer are in a polymerized form, more preferably, all of the oxyanion-containing monomer and/or oligomer is in a polymerized form. As used herein "in a polymerized form" refers to the polymerizable entities of the oxyanion-containing monomer and/or oligomer being polymerized. While not wanting to be limited by example, the polymerizable entity of vinyl phosphonic acid is the vinyl group. The unpolymerized form of the vinyl group may be represented by the chemical formula $H_2C=CH-$ and the polymerized form may be represented by the chemical formula $-CH_2-CH-$. It can be appreciated that the polymerized form of the oxyanion-containing monomer and/or oligomer forms an oxyanion-containing polymeric composition. The oxyanion-containing polymeric composition can be selected from the group of polymeric compositions consisting of olefins, styrenes, vinyls, acrylicates, halo-olefins, dienes, oxides, esthers, acetals, sulfides, thioesters, amides, thioamides, urethanes, thiourethanes, ureas, thioureas, imides, thioimides, anhydrides, thianhydrides, carbonates, thiocarbonates, imines, siloxanes, silanes, phosphazenes, ketones, thioketones, sulfones, sulfoxides, sulfonates, sulfoamides, phylenes, and combinations and/or mixtures thereof.

The polymerized form of the oxayanion-containing monomer and/or oligomer may comprise a homopolymer or a co-polymer. Non-limiting examples are copolymers made from at least two of the following monomers: vinylphosphonic acid, allyl phosphonic acid, alkenylphosphonic acids such as isopropenylphosphonic acid, 1,1-vinylidene diphosphonic acid, styrenes bearing phosphonate or phosphate groups.

Co-polymers containing phosphonic or phosphoric acid groups as well as repeating units bearing other functional groups may be used. Such groups could be phosphonic esters, carboxylic acids or esters, carboxylic amides, amines, sulfoxides, sulfones, sulphonic acids, ethers, thioethers, and alkyl- or perfluoroalkyl chains. Non-limiting examples are poly(vinylphosphonic acid-co-acrylic acid) and corresponding acrylates, poly(vinylphosphonic acid-co-methacrylic acid) and corresponding methacrylates, poly(vinyl alcohol) partially esterified with phosphoric acid. Furthermore, co-polymers of phosphonic acids and esters of phosphonic acids can be obtained by partial hydrolysis of polymeric phosphonic esters, homopolymers as well as copolymers, or by direct copolymerization of phosphonic acids with phosphonic esters. The ester groups are chosen so as to give suitable electric- and process properties of the material, and can contain mono- as well as diesters. One example is poly(vinylphosphonic acid-co-(O-monoethyl vinylphosphonate)).

The co-polymer may further comprise polyvinyl alcohol, polyvinyl acetate, polyacrylic acid/polyacrylates, polyacrylamides or polyuretanes, polyesters, polyamides, polyethers, polyimines, polymethylvinylether-maleic acid, polyvinylpyrrolidone, polyacrylonitrile, cellulose or cellulose acetate polythiophenes (e.g., PEDOT), poly(vinylphosphonic acid)-blend-poly(acrylic acid) (PAA), poly(vinylphosphonic acid)-blend-poly(maleic acid), poly(vinylphosphonic acid)-blend-poly(styrenesulfonic acid), poly(vinylphosphonic acid-co-acrylic acid)-blend-poly(acrylic acid), poly(vinylphosphonic acid-co-acrylic acid)-blend-poly(methacrylic acid), poly(vinylphosphonic acid-co-acrylic acid)-blend-poly(maleic acid), and poly(vinylphosphonic acid-co-acrylic acid)-blend-poly(styrenesulfonic acid).

In some embodiments, each polymerizable entity "R" may have one or more oxyanions. While not wanting to be limited by example, each oxyanion-containing monomer and/or oligomer comprise one polymerizable entity "R" having no more than about twelve oxyanions, no more than about eleven oxyanions, no more than about ten oxyanions, no more than about nine oxyanions, no more than about eight oxyanions, no more than about seven oxyanions, no more than about six oxyanions, no more than about five oxyanions, no more than about four oxyanions, no more than about three oxyanions, no more than about two oxyanions, or no more than about one oxyanion. Preferably, the each oxyanion-containing monomer and/or oligomer comprise one polymerizable entity "R" having no more than one oxyanion. More preferably, the oxyanion-containing monomer and/or oligomer comprise vinyl phosphonic acid.

Vinyl phosphonic acid can be represented by the following chemical formulae $CH_2=CH-P(=O)(OH)_2$; $CH_2=CH-P(=O)(OH)O^-$; or $CH_2=CH-P(=O)(O)_2^{2-}$, those of ordinary skill in the art would appreciate that the chemical formulae represent vinyl phosphonic acid as a monomer in its unpolymerized and/or monomer.

In some embodiments, each polymerizable oxyanion may have one or more polymerizable entities "R". While not wanting to be limited by example, each oxyanion-containing monomer and/or oligomer comprises one oxyanion having no more than about three polymerizable entities "R", no more than about two polymerizable entities "R", or no more than about one polymerizable entity "R". Preferably, the each oxyanion-containing monomer and/or oligomer comprises one oxyanion having no more than about two polymerizable entities "R".

In some embodiments, the group IVB metal-containing monomer and/or oligomer comprise an oxyanion-containing group IVB metal-containing monomer and/or oligomer. The group IV-B metal may be one selected from the group IV-B consisting of zirconium, titanium and a mixture thereof. In a preferred embodiment, the group IV-B metal is one or both of zirconium and titanium and/or the oxyanion is one or both of phosphate and sulfate.

Preferably, the group IV-B metal-containing monomer and/or oligomer comprise a group IV-B metal oxyanion-containing compound formed by reacting an oxyanion-composition with a group IV-B metal-containing compound. The oxyanion-containing composition may or may not differ from the oxyanion-containing monomer and/or oligomer. By way of a non-limiting example, the group IV-B compound may comprise a group IV-B oxy halide, such as but not limited to zirconyl chloride (that is, oxozirconium (IV) chloride). While not wanting to be limited by example, the oxyanion-containing compound is vinyl phosphonic acid. More preferably, the group IV-B metal-containing monomer and/or oligomer comprise the reaction product of zirconyl chloride with vinyl phosphonic acid. More specifically, the group IV-B metal-containing monomer and/or oligomer comprise zirconium phosphate formed by reacting zirconyl chloride with vinyl phosphonic acid.

Preferably, the group IV-B metal of the group IVB metal-containing monomer and/or oligomer chemically interacts with the at least some polymerized oxyanion monomer and/or oligomer. As used herein "chemical interacts" means an interaction causing a change in a chemical property. As used herein, a chemical property means any property associated with chemical reactivity. A physical property means any property not associated with a chemical reactivity. Non-limiting examples of physical properties are conductivity, thermal properties, crystalline and/or amorphous phase properties, physical shape and/or form, absorption, concentration, density, dielectric, ductility, melt and/or softening point, permeability, solubility, and diffusion coefficient. Non-limiting examples of chemical properties are chemical composition, bond structure (such as but not limited to covalent, ionic, coordination, electrostatic, van der Waals or London force), and chemical reactivity and/or stability.

More specifically, the chemical interaction of the group IV-B metal is with one or more oxygen atoms comprising one or more oxyanions comprising the at least some of the polymerized oxyanion-containing monomer and/or oligomer. More preferably, the group IV-B metal chemically interacts with at least some of the oxyanions comprising the one or more oxygen atoms of the oxyanions comprising the least some polymerized oxyanion-containing monomer and/or oligomer to substantially cross-link the least some of the polymerized oxyanion-containing monomer and/or oligomer.

In a preferred embodiment, the zirconium phosphate chemically interacts with the at least partially polymerized vinyl phosphonic acid. More specifically, at least some zirconium comprising the zirconium phosphate chemically interacts with at least some phosphonic oxyanions comprising the at least partially polymerized vinyl phosphonic acid. The chemical interaction of the least some zirconium with the at least some phosphonic oxyanions cross-links at least some of the partially polymerized vinyl phosphonic acid. While not wanting to be limited by theory, it is believed that the zirconium chemically interacts with one or more oxygen atoms of an oxyanion.

Incorporation of the zirconium phosphate in the composition substantially increases one or both of the physical (such as mechanical) and chemical properties of the composition compared to a polymer of the same composition lacking the zirconium phosphate. Compositions having the zirconium phosphate have increased resistance to humidity and/or chemical degradation (compared to compositions lacking zirconium phosphate). Furthermore, while not wanting to be bound by any theory, it is believed zirconium phosphate cross-linking in the composition improves the proton conductivity compared to compositions lacking zirconium phosphate cross-linking.

In some embodiments, the group IVB metal-containing monomer and/or oligomer is substantially dispersed in the composition. Typically, compositions having no more than about 20 weight percent of the group IV-B metal-containing monomer and/or oligomer have the group IV-B metal-containing monomer and/or oligomer substantially dispersed in the composition. For example, compositions having no more than about 20 weight percent of zirconium phosphate and about 80 weight percent polymerized vinyl phosphonic acid substantially have the zirconium phosphate dispersed in the composition. More preferably, the group IV-B metal-containing monomer and/or oligomer dispersed in the composition may or may not have a substantially non-lamellar structure. Furthermore, the group IV-B metal-containing monomer and/or oligomer are highly distributed in the composition and have no preferred orientation in the composition.

In other embodiments, the composition has at least some crystalline regions. The one or more crystalline regions have one or more substantially sharp x-ray diffraction peaks in an x-ray analysis of the composition. The crystalline regions substantially comprise crystalline forms of the group IV-B metal-containing monomer and/or oligomer. Typically, compositions having more than about 40 weight percent of the group IV-B metal-containing monomer and/or oligomer have at least some crystalline regions of the group IV-B metal-containing monomer and/or oligomer in the composition. For example, compositions having more than about 40 weight percent of zirconium phosphate in composition have at least some zirconium phosphate crystalline regions. More typically, compositions having more than about 40 weight percent of zirconium phosphate comprising zirconium phosphate and about 60 weight percent polymerized vinyl phosphonic acid typically have at least some crystalline zirconium phosphate regions in the composition. These crystalline regions are also typically referred to as crystalline agglomerates. More preferably, the zirconium phosphate may or may not have a substantially non-lamellar structure. Furthermore, the zirconium phosphate is highly distributed in the composition and has no preferred orientation in the composition.

The composition may comprise from about 1 to about 99 weight percent of the group IV-B metal-containing monomer and/or oligomer and/or from about 99 to about 1 weight percent of the oxyanion-containing monomer and/or oligomer, each based on the total weight of the composition. Preferably, the composition comprises from about 10 to about 80 weight percent of the group IV-B metal-containing monomer and/or oligomer and/or from about 90 to about 20 weight percent of the oxyanion-containing monomer and/or oligomer. More preferably, the composition comprises from about 15 to about 70 weight percent of the group IV-B metal-containing monomer and/or oligomer and/or from about 85 to about 30 weight percent of the oxyanion-containing monomer and/or oligomer.

In a preferred embodiment, the composition comprises from about 1 to about 99 weight percent of the vinyl phosphonic acid and/or from about 99 to about 1 weight percent of the zirconium phosphate, each based on the total weight of the composition. Preferably, the composition comprises from about 10 to about 80 weight percent of the zirconium and/or from about 90 to about 20 weight percent of the vinyl phosphonic acid. More preferably, the composition comprises from about 15 to about 70 weight percent of the zirconium phosphate and/or from about 85 to about 30 weight percent of the vinyl phosphonic acid.

The composition is thermally stable. Preferably, the composition is commonly thermally stable to a temperature of at least about 300 degrees Celsius, more commonly to a temperature of at least about 250 degrees Celsius, even more commonly to a temperature of at least about 200 degrees Celsius, yet even more commonly to a temperature of at least about 150 degrees Celsius, or still yet even more commonly to a temperature of at least about 100 degrees Celsius. As used herein "thermally stable" refers to a differential scanning calorimetry scan of the composition fails to substantially detect one or preferably both of a further polymerization and chemical change of the composition comprising a chemical interaction. That is, the composition may undergo physically changes detected in a differential scanning calorimetry scan, such as, melting, glass transitions and still comprise a thermally stable composition.

In some embodiments, the compositions have conductivity. The composition may have a conductivity of at least about 0.01 mS/cm for a temperature from about −20 degrees Celsius to about 160 degrees Celsius and/or for a relative humidity from about 0% to about 100%. More specifically, compositions according to some embodiments commonly have a conductivity of at least about 10 mS/cm, more commonly of at least about 50 mS/cm, even more commonly of at least about 100 mS/cm, yet even more commonly of at least about 110 mS/cm, still yet even more commonly of at least 130 mS/cm or still yet even more commonly of at least about 150 mS/cm at one or both of a temperature typically of at least about 20 degrees Celsius, more typically of at least about 25 degrees Celsius, even more typically at least about 40 degrees Celsius, yet even more typically at least about 60 degrees Celsius, still yet even more typically at least about 80 degrees Celsius, yet even more typically at least about 100 degrees Celsius, or still yet even more typically at least about 110 degrees Celsius and a relative humidity of least about 0%, preferably a relative humidity of at least about 25%, more preferably a relative humidity of at least about 50%, even more preferably a relative humidity of least about 75%, yet even more preferably a relative humidity of at least about 95% percent or still yet even more preferably a relative humidity of at least about 100%.

Some compositions according to some embodiments have a conductively of at least about 150 mS/cm at about 80 degrees Celsius and about 95% relative humidity. Other compositions according other embodiments have a conductivity of at least about 100 mS/cm at about 110 degrees Celsius and 25% relative humidity. Even other compositions according to even other embodiments have a conductivity of at least about 40 mS/cm at about 110 degrees Celsius and about 25% relative humidity.

The conductivity of the compositions can be determined by any suitable method know to those of ordinary skill in the art. A non-limiting example of one suitable method for determining conductivity of the composition is electrochemically impedance spectroscopy. Preferably, electrochemical impedance spectroscopy method is one using a 4-electrode and/or four-point configuration.

Compositions according to some embodiments may be formed into films and/or membranes. Preferably, the films or membranes may be formed by any method known within the art. Non-limiting examples of suitable methods for forming the films and/or membranes are casting, extruding, solvent evaporation, drawdown to name a few. It can be appreciated that the chemical and/or physical properties of the compositions are substantially maintained when the compositions are in the form of a film and/or membrane.

The film and/or membrane can have any suitable thickness. Commonly the film and/or membrane has a thickness typically of no more than about 10 cm, more typically no more than about 5 cm, more typically no more than about 1 cm, even more typically no more than about 500 mm, even more typically no more than about 100 mm, yet even no more than about 10 mm, still yet even no more than about 1 mm still yet even no more than about 100 µm, still yet even no more than about 50 µm, yet even no more than about 10 µm, or yet even no more than about 1 µm.

The film and/or membrane are substantially clear. Preferably, the film and/or membrane are substantially flexible. As used herein "flexible" refers to the film and/or membrane can be deformed by one or both of shear and angular stresses without substantial damage and/or permanent deformation of the film and/or membrane. Preferably, the film and/or membrane comprises a substantially clear polymeric membrane. That is, the polymeric membrane has a percent transmittance to one or more wavelengths of visible light of at least about 40%, preferably at least about 50%. More preferably, the polymeric membrane has a percent transmittance of one or more wavelengths of visible light of at least about 75%. Even more preferably, the polymeric membrane has a transmittance to one or more visible wavelengths of light of at least about 90%.

Another embodiment includes an apparatus containing one or both of the compositions and membranes according to various embodiments contained herein. Preferably, the apparatus includes the composition in the form of a membrane. One or both of the composition and membrane are preferably formed for utilization in one of fuel cell membrane, water or gas purification membrane, reactive membrane, electrodialysis membrane, electrochemical or electrode membrane, sensor membrane or a combination thereof. More specifically, the oxyanion-containing monomer and/or oligomer and group IV-B metal-containing monomer and/or oligomer are selected to provide a composition having chemical and physical properties for one of fuel cell membrane, water or gas purification membrane, reactive membrane, electrodialysis membrane, electrochemical or electrode membrane, or sensor membrane. The membrane is configured in the apparatus. Preferably the apparatus is selected from the group consisting of fuel cells, water or gas purification apparatuses, chemical reactors, electrodialysis apparatuses, electrochemical cells, electrodes, sensors, and combinations thereof.

Another embodiment is a process for making compositions according to embodiments described herein.

A process for making a composition includes forming a mixture of an oxyanion-containing monomer and/or oligomer and group IV-B metal-containing monomer and/or oligomer and polymerizing at least some of the oxyanion-containing monomer and/or oligomer in the presence of the group IV-B metal-containing monomer and/or oligomer. The polymerizing includes polymerizing at least some of the oxyanion-containing monomer and/or oligomer. In some embodiments, the process further includes chemical interaction between at least some group IV-B metal of the group IV-B metal-containing monomer and/or oligomer with at least some oxygen atom(s) of the oxyanion-containing monomer and/or oligomer.

A preferred process for making a composition includes forming a mixture of vinyl phosphonic acid and zirconium phosphate and polymerizing at least some of the vinyl phosphonic acid in the presence of the zirconium phosphate. The polymerizing includes polymerizing at least some of the vinyl phosphonic acid. In some embodiments, the process further includes chemical interaction between at least some zirconium of the zirconium phosphate with at least some oxygen of the vinyl phosphonic acid.

Preferably, the polymerizing process for is selected from the group of polymerization processes consisting of free radical, anionic, step polymerization, and cationic. Initiation of the polymerization is by one or both of chemical and photo initiators. The chemical initiator is selected from the group consisting of an organic molecule, a non-metal containing molecule, a metal, a metal-containing molecule, a redox initiator and a combination thereof. The photo initiator is selected from the group consisting of ultra violet light, electron beam, x-ray beam, electro-magnetic energy, thermal energy and a combination thereof. Preferably, the polymerization is by a photo initiator. More preferably, the photo initiator is selected from the group of ultra violet light, electron beam or x-ray beam. Even more preferably the photo initiator is one of ultra violet light or electron beam.

EXAMPLES

Preparation of Zirconium Phosphate

Vinyl phosphonic acid was reacted with a zirconyl chloride solution (30% in hydrochloric acid) to form zirconium phosphate. The zirconyl chloride solution and vinyl phosphonic acid were used as received from Sigma-Aldrich. A 1 M aqueous (de-ionized water) solution of vinyl phosphonic acid was contacted and reacted at ambient room temperature with the 30 wt % zirconyl chloride solution in hydrochloric acid at a molar ratio of 1 mole of zirconyl chloride to 2 moles of vinyl phosphonic acid to form zirconium phosphate. The zirconium phosphate was isolated by filtration and rinsed with de-ionized water. After rinsing, the isolated vinyl zirconium phosphate was dried for about 2 hours at 70 degrees Celsius.

Preparation of a Membrane 1

Vinyl phosphonic acid and $ZrOCl_2$ were purchased from Sigma Aldrich and used as received. Zirconium phosphate was prepared according the methods of Alberti et al., *Journal of Inorganic and Nuclear Chemistry*, 40, 1113, (1978). The zirconium phosphate was made into an amorphous copolymer with the vinyl phosphonic acid by adding 20 wt % the zirconium phosphate powder to 80 wt % of the viscous liquid vinyl phosphonic acid. The amorphous copolymer was cast as a film. The cast film was passed through a Fusion UV curing system a couple of times to form a clear, flexible membrane. The membrane slightly yellowed and turned more brittle after time.

Preparation of a Membrane 2

About 20 parts zirconium phosphate was contacted and agitated in a glass container with about 80 parts of vinyl phosphonic acid and about 5 parts of an ultra violet photoinitiator (2-hydroxy-2-methyl-1-phenyl-1-propane-one) to form a suspension. The suspension was a white color and was a substantially thick, opaque paste. An inert gas (nitrogen or argon) was bubbled through the suspension to purge at least some, if not most, of the oxygen gas contained within the suspension out of the suspension. The purging of the oxygen gas from the suspension was to reduce inhibition of the polymerization reaction by oxygen contained within the suspension. After purging, the glass container is sealed and the suspension was mixed by sonication.

The mixed suspense was cast between two sheets to form a cast film. Each sheet had a silicone-treated surface. The cast film was exposed to ultra-violet radiation to form a polymeric membrane.

The polymeric membrane was substantially clear and flexible and could be deformed shear stresses, without damage and/or substantial permanent deformation. The polymeric membrane developed some yellow coloration with time. Moreover, the polymeric membrane lost flexibility and became more brittle as the polymeric membrane aged.

Membrane Characterization

FIG. 1 depicts X-ray diffraction analysis of compositions according to some embodiments. The X-ray diffraction was from 5 to 90 degrees at 2 using Cu k x-ray source. FIG. 1 depicts the X-ray diffraction pattern of the zirconium phosphate monomer (spectrum (a) of FIG. 1), a composition comprising 15 wt % zirconium phosphate and 85 wt % vinyl phosphonic acid (spectrum (b)), a composition comprising 20 wt % zirconium phosphate and 80 wt % vinyl phosphonic acid (spectrum (c)), and a composition comprising 40 wt % zirconium phosphate and 60 wt % vinyl phosphonic acid (spectrum (d)). The X-ray diffraction pattern of the zirconium phosphate indicates a substantially crystalline character, as indicated by the substantially shape x-ray diffraction peaks at 2 Θ angles of about 8, 15, 18, 23, 28, 34 and 36 degrees. Furthermore, substantial lack of the strong, sharp peaks at about 8, 15, 18, 23, 28, 34 and 36 degrees and the presence of a single substantially broad peak at about a 2 Θ angle of about 21 indicates substantially amorphous character for the compositions comprising 15 wt % zirconium phosphate and 85 wt % vinyl phosphonic acid, spectrum (b) and 20 wt % zirconium phosphate and 80 wt % vinyl phosphonic acid spectrum (c). The presence of some peaks corresponding to the zirconium phosphate in the composition comprising 40 wt % zirconium phosphate and 60 wt % vinyl phosphonic acid spectrum (d) indicates the presence of some crystalline agglomerates of zirconium phosphate within the composition. Moreover, the X-ray diffraction spectra show a monomer that fully disperses and co-polymerizes to form an amorphous membrane. Furthermore, the X-ray data indicates that for compositions having no more than about 20 wt % zirconium phosphate the composition is substantially amorphous. However, the zirconium phosphate can be agglomerated to form compositions having a crystalline phase for compositions having about 40 wt % or more zirconium phosphate. While not wanting to be limited by theory, the crystalline agglomerates and/or phases may comprise zirconium phosphate. The crystalline agglomerates zirconium phosphate may be zirconium phosphate remaining after the polymerization of the vinyl phosphonic acid. More specifically, the insoluble, crystalline zirconium phosphate may be zirconium phosphate substantially un-associated with the phosphonic group of vinyl phosphonic acid. Furthermore, the lower intensity of the peaks at about 8, 15, 18, 23, 28, 34 and 36 degrees in the compositions having about 40 wt % or more zirconium phosphate compared to the compositions having less than about 40 wt % zirconium phosphate may be indicative of the compositions having about 40 wt % or more zirconium phosphate being less crystalline than the compositions having less than about 40 wt % zirconium phosphate.

Figure 2A:
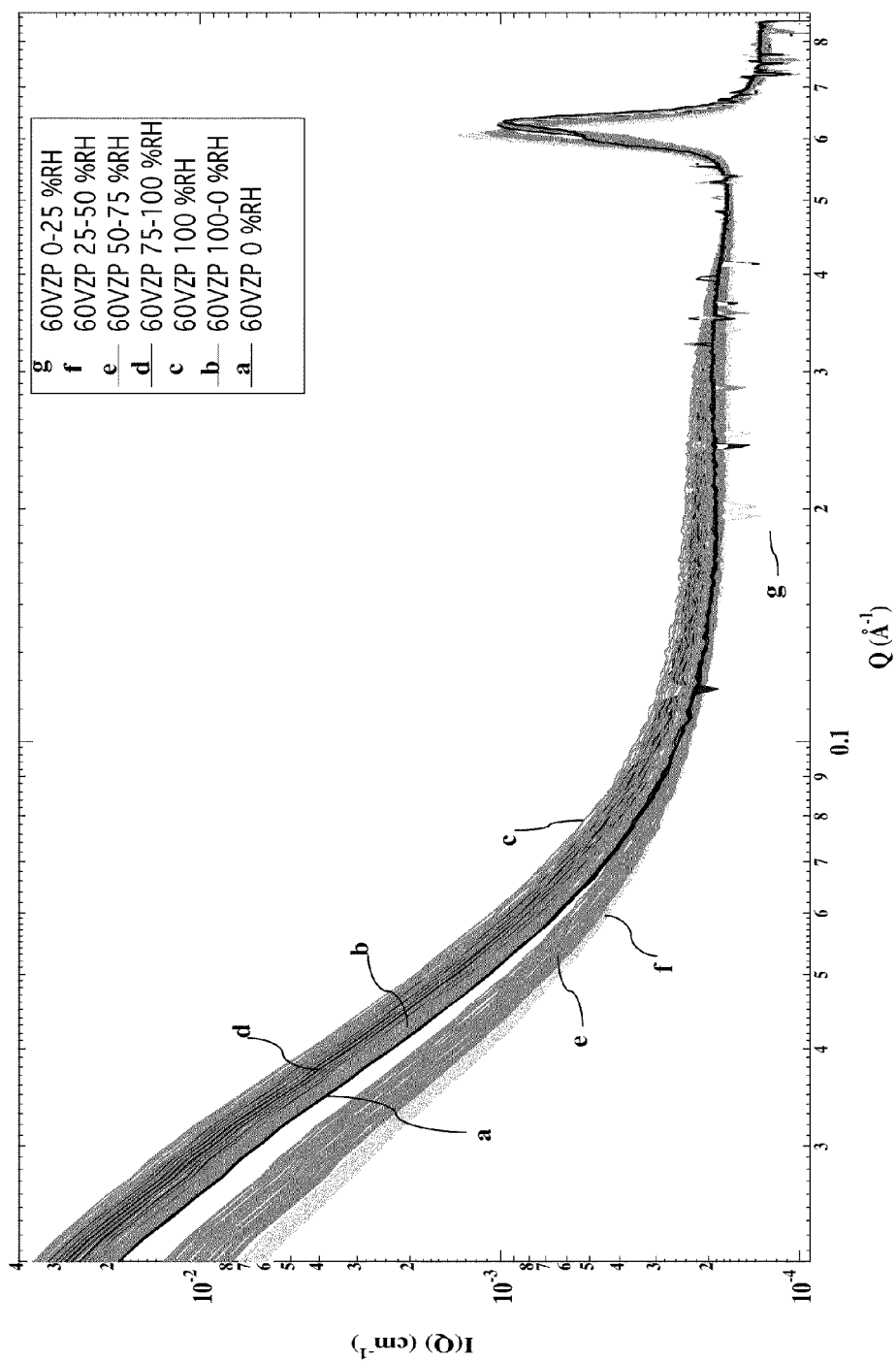
FIGS. 2A-2C depict small angle X-ray scattering of compositions according to some embodiments.
Figure 2B:
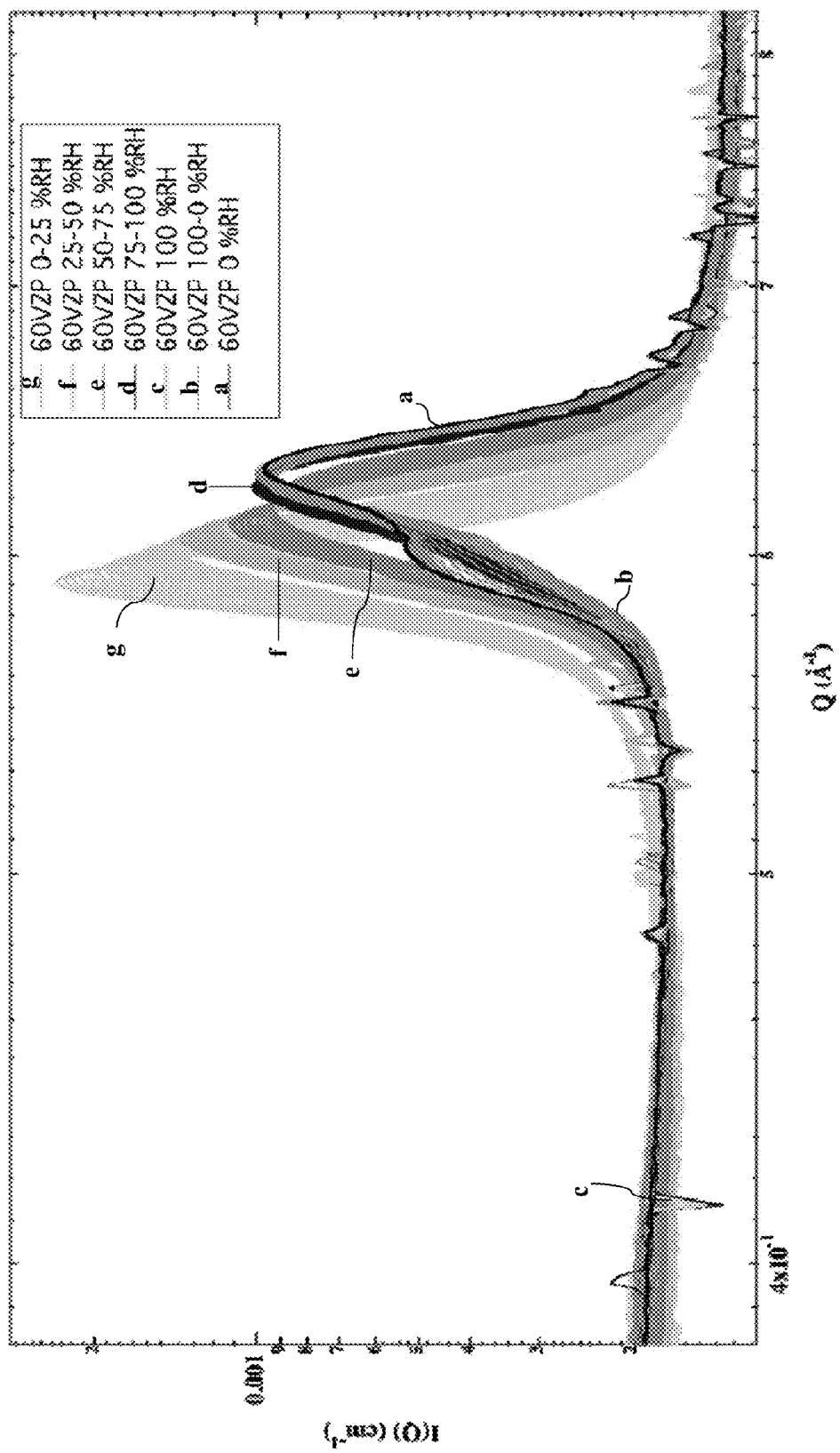
Figure 2C:
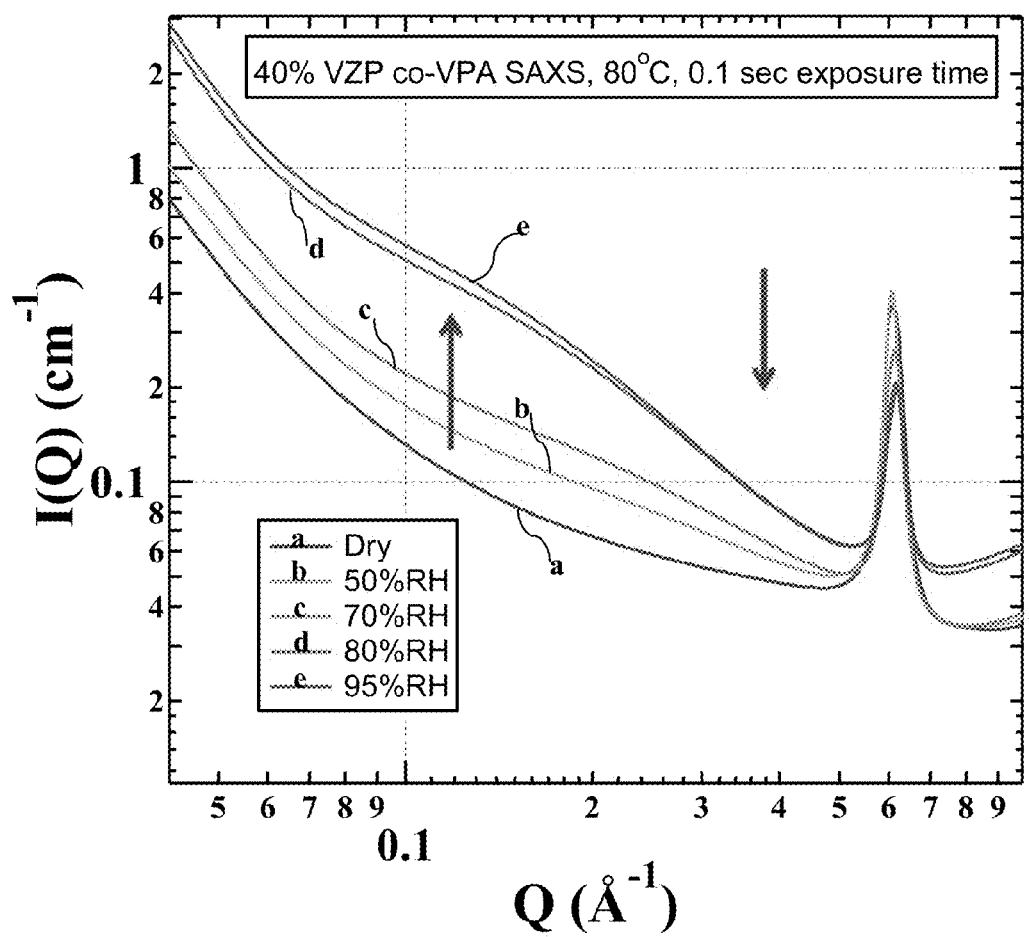

FIGS. 2A-2C depict small angle X-ray scattering of compositions according to some embodiments. The small angle X-ray scattering was performed at the Argonne Advanced Photon Source (APS) in Argonne, Ill. Silver behenate was used to verify Q range. The small angle X-ray scattering analysis further shows changes in the composition amorphous and crystalline character with changes in humidity.

FIGS. 2A and 2C show increases in the amorphous character of the composition with increases in humidity (see arrow 101). More specifically, broadening and intensity in the region from about 0.1 to about 0.02 inverse Angstroms is indicative of increases amorphous character. The broadening and increasing in intensity in region from about 0.1 to about 0.3 inverse Angstroms with increases in humidity are believed to be due to water absorption and/or water swelling of the non-crystalline, amorphous regions of the compositions. While not wanting to be limited by any theory, it is believed that the water absorption and/or water swelling is substantially limited to regions of the composition lacking zirconium phosphate, that is, to the regions of the composition comprising vinyl phosphonic acid.

FIGS. 2B and 2C, shows decreases in the 0.59 inverse Angstroms peak intensity with increases in relative humidity. The 0.59 inverse Angstrom peak is believed to be indicative of the crystalline character of the composition. More specifically, 0.59 inverse Angstrom peak is believed to be indicative the crystalline character of zirconium phosphate phase and/or component in the composition. While not wanting to be bound by any theory, it is believed that decreases in the 0.59 inverse Angstrom peak correspond to loss of crystalline character of the composition, more specifically a loss of crystalline character associate with the zirconium phosphate. Furthermore, the 0.59 inverse Angstrom peak changes shown in FIGS. 2B and 2C differ. FIG. 2B depicts the small angle x-ray scattering pattern for a composition comprising about 60 wt % zirconium phosphate about 40 wt % vinyl phosphonic acid, while FIG. 3C depicts the small angle x-ray scattering pattern for a composition comprising changes in the crystalline and amorphous character, as determined by small angle X-ray scattering, of a composition comprising about 40 wt % zirconium phosphate and about 60 wt % vinyl phosphonic acid. More specifically, FIG. 3C shows substantially a decrease in the 0.59 inverse Angstrom peak with increases in relative humidity, while FIG. 2B shows a shifting of the peak with increases in relative humidity from about 0.59 inverse Angstroms to about 0.63 inverse Angstroms. at dry (curve (a)), about 50% (curve (b)), about 70% (curve (c)), about 80% (curve (d)) and about 95% (curve (e)) relative humidities at about 80 degrees Celsius.

Drying of the composition after exposure to a humidity of more than about 50% at about 80 degrees Celsius forms a phase having a character other than the 0.6 and 0.1-0.3 inverse Angstrom phases, this other phase formed upon drying is not depicted in FIG. 2.

The small angle X-ray scattering further shows that compositions having about 20 wt % zirconium phosphate and about 80 wt % vinyl phosphonic acid initially swell when exposed to humidity, but eventually shrink as the relative humidity increases. While not wanting to be limited by theory, this is believed to be due to at least some of the composition dissolving or being solubilized in high relative humidity environment. Furthermore, it is believed that low molecular weight vinyl phosphonic acid polymer chains may comprise the portion of the composition being dissolved and/or solubilized.

The small X-ray scattering analysis further shows that compositions having about 40 wt % zirconium phosphate and about 60 wt % vinyl phosphonic acid swell when exposed to humidity, but have a smaller tendency to shrink as the relative humidity increases. While not wanting to be bound by any theory, it is believed that increasing the molecular weight of the vinyl phosphonic acid polymer decreases the tendency of the composition to dissolve and/or solubilize when exposed to high, that is greater than about 50% relative humidity at temperatures greater than about 25 degrees Celsius.

Figure 3:
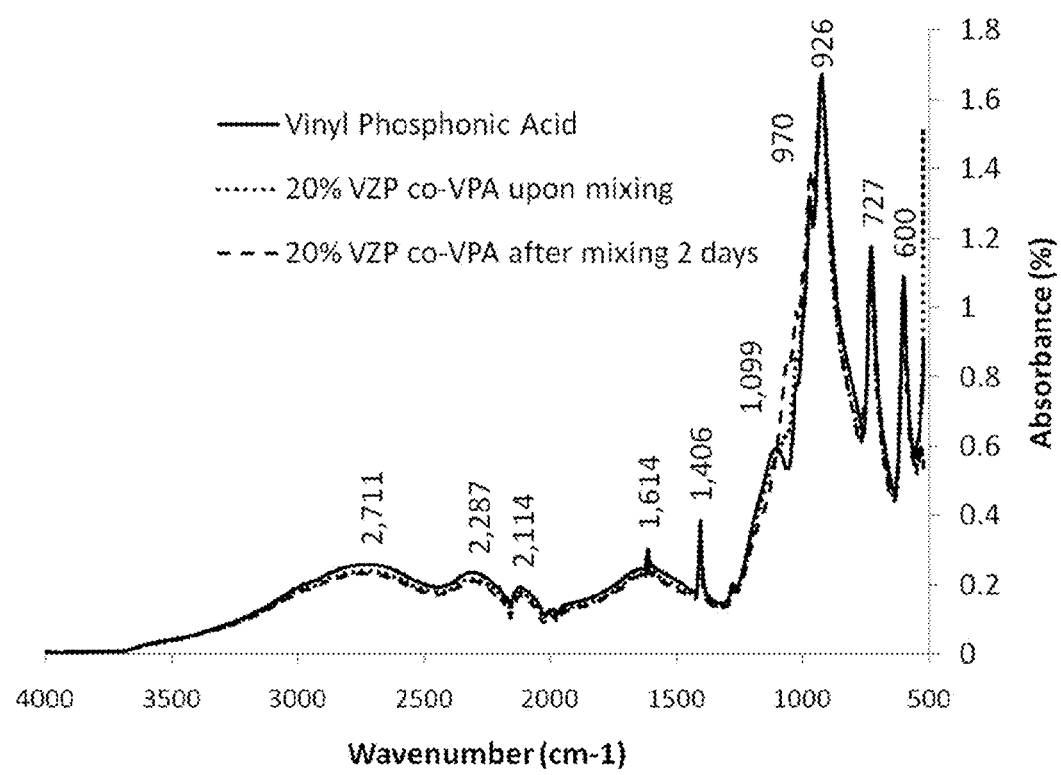
FIG. 3 depicts Fourier transform infrared spectra of compositions according to some embodiments.

FIG. 3 depicts Fourier transform infrared spectra of vinyl phosphonic acid alone and after mixing with zirconium phosphate. More specifically FIG. 3 depicts a comparison of the infrared spectra of vinyl phosphonic acid to a mixture comprising about 20 wt % zirconium phosphate with about 80 wt % vinyl phosphonic acid substantially after mixing and about 2 days after mixing. The Fourier transfer infrared analysis was performed with a Thermo-Nicolet 2100 in attenuated response mode. The infrared spectra confirm most of the chemical functional groups related to vinyl phosphonic acid are present after mixing the vinyl phosphonic acid with zirconium phosphate, as depicted in FIG. 3.

The vibrational spectrum of vinyl phosphonic acid (solid line in FIG. 3) has a vibrational band at about 729 $cm^{-1}$, this band is typically representative of a P—C bond stretch. The region from about 800 to about 1200 $cm^{-1}$ substantially comprises overlapping of P—OH, P=O, P—H, P—O vibrations associated with one or both of bending and stretching vibrations. The vibrational bands at about 1612 and 2299 $cm^{-1}$ are typically indicative POH vibrational modes. It is believed that the peak at about 1612 $cm^{-1}$ is indicative of a vinyl (that is, C=C) group of vinyl, such as the vinyl group of vinyl phosphonic acid. The band at about 2299 $cm^{-1}$ may be associated with a P—H stretch. The band at about 2115 $cm^{-1}$ is believed to be associated with a C—C vibrational mode, while not wanting to bound by any theory, the C—C vibration is believed to be shifted from its typical frequency of about 1500 $cm^{-1}$ due to its proximity to and/or association with the phosphonic acid group.

The infrared spectrum of the composition, compared to the spectrum of vinyl phosphonic acid, contains vibrational bands associated with zirconium phosphate and/or zirconium phosphonate in addition to the vibrational bands associated with vinyl phosphonic acid. Compared to vinyl phosphoric acid, the composition exhibits a vibrational band at about 1050 $cm^{-1}$. Further, the vinyl phosphonic acid vibrational band at about 1099 $cm^{-1}$ shifts when vinyl phosphonic acid is contacted with zirconium phosphate, which is believed to be due to a chemical interaction between the vinyl phosphonic acid and zirconium phosphate and/or zirconium phosphonate. The infrared spectra of a mixture comprising about 20 wt % zirconium phosphate and/or zirconium phosphonate and about 80 wt % vinyl phosphonic acid upon mixing and about 2 days thereafter are about substantially equivalent. The substantial difference between the infrared spectra is the vibrational band at about 1099 cm$^{-1}$.

Figure 4A:
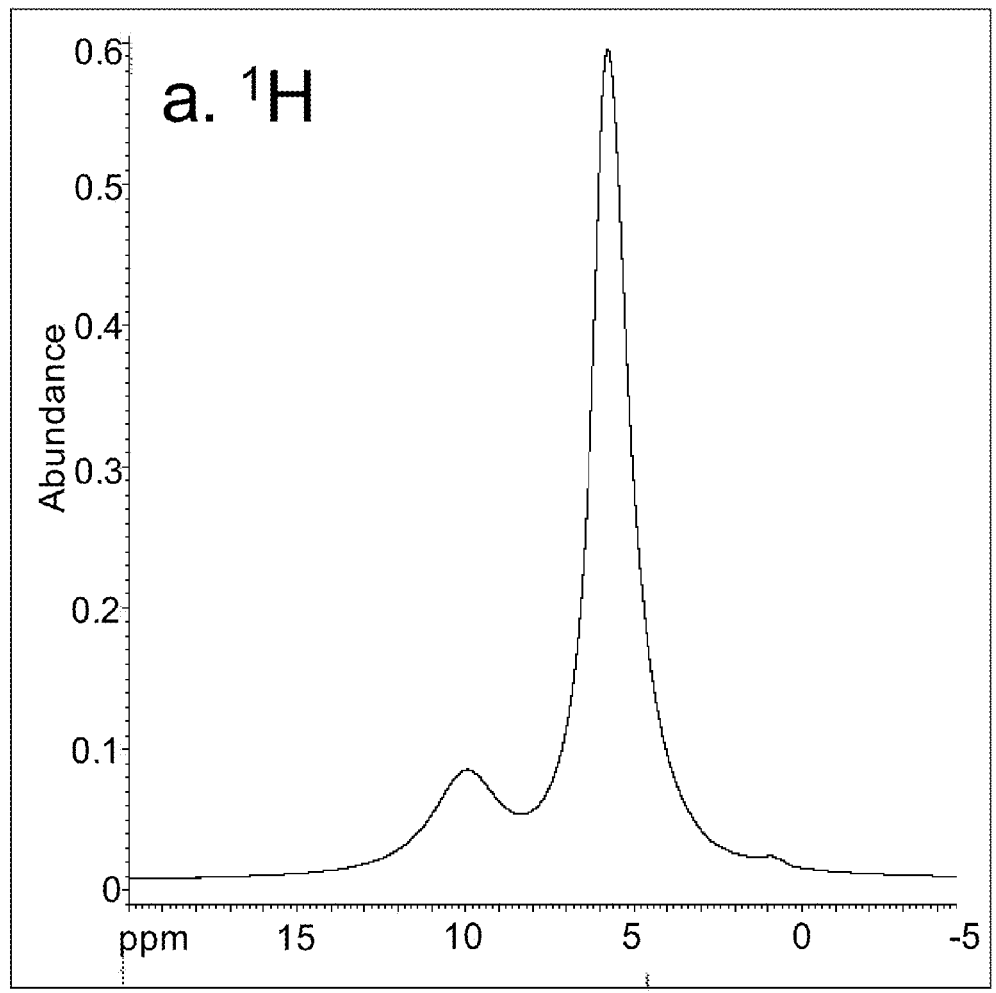
FIGS. 4A-4F depict $^1$H, $^{31}$P and $^{13}$C solid state charge polarized magic angle spinning nuclear magnetic resonance spectra of compositions according to some embodiments.
Figure 4B:
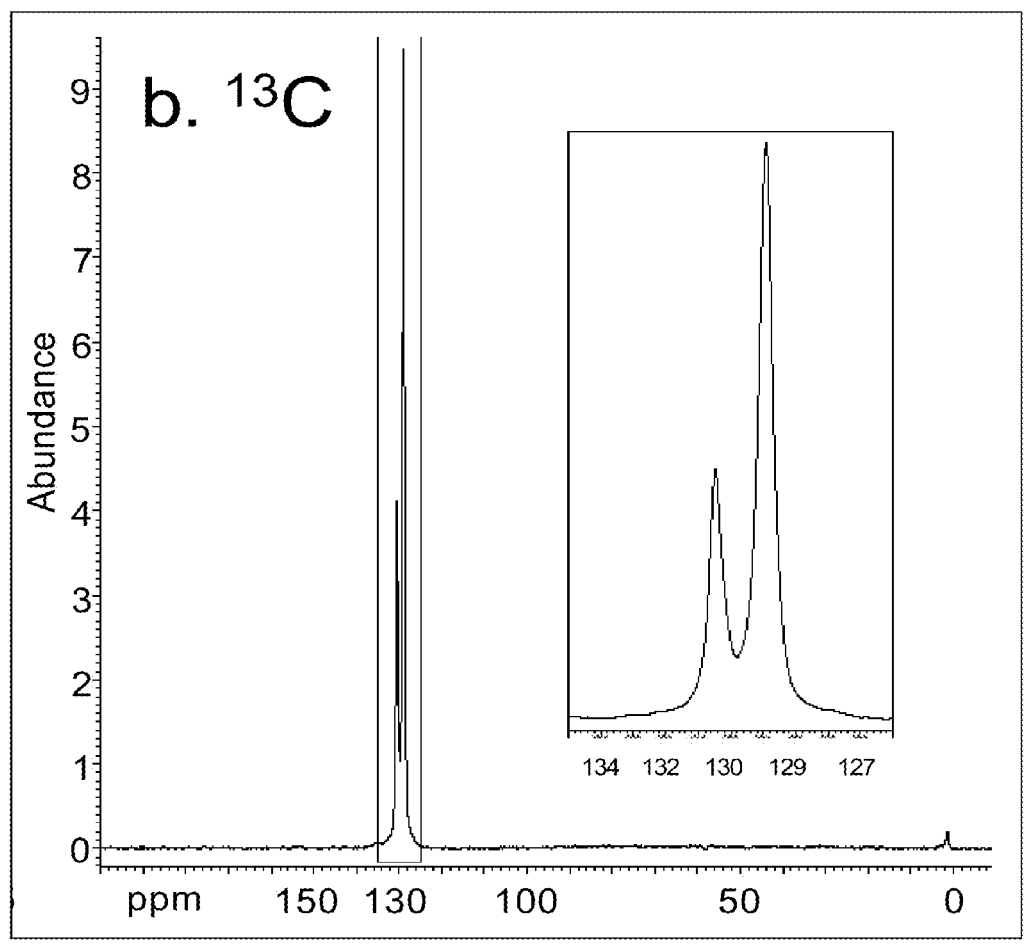
Figure 4C:
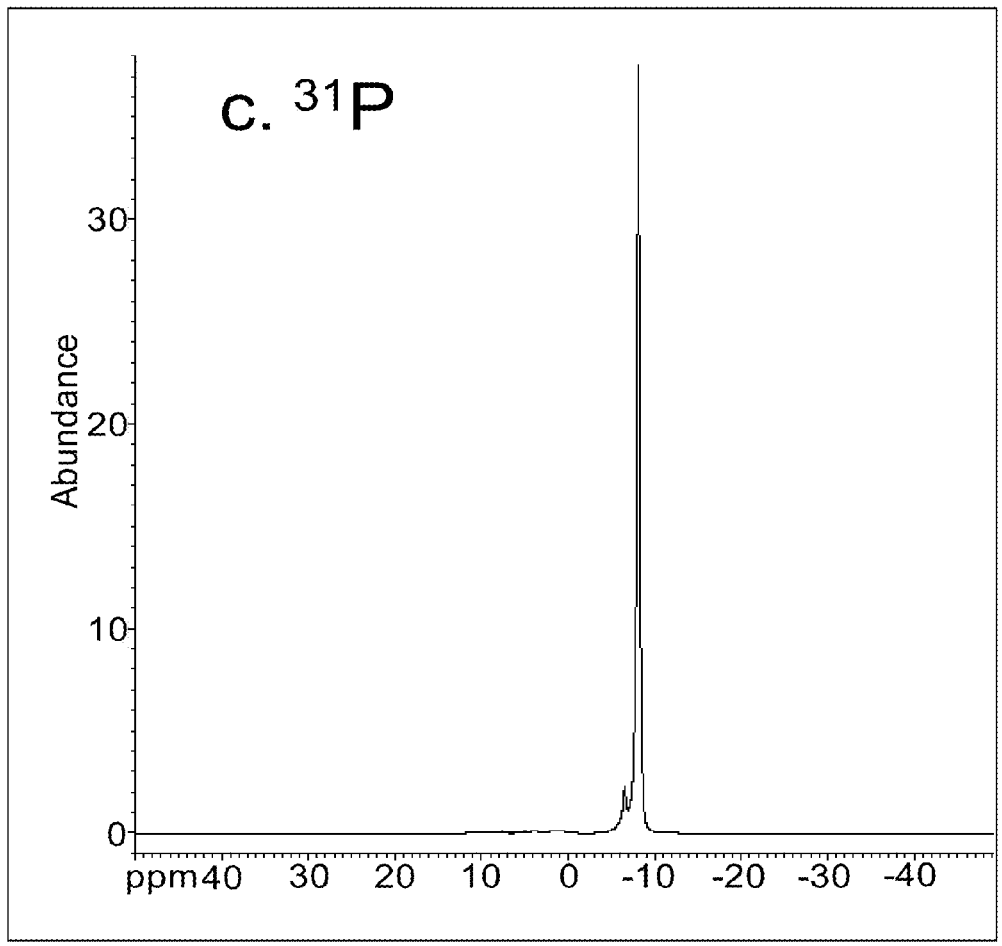
Figure 4D:
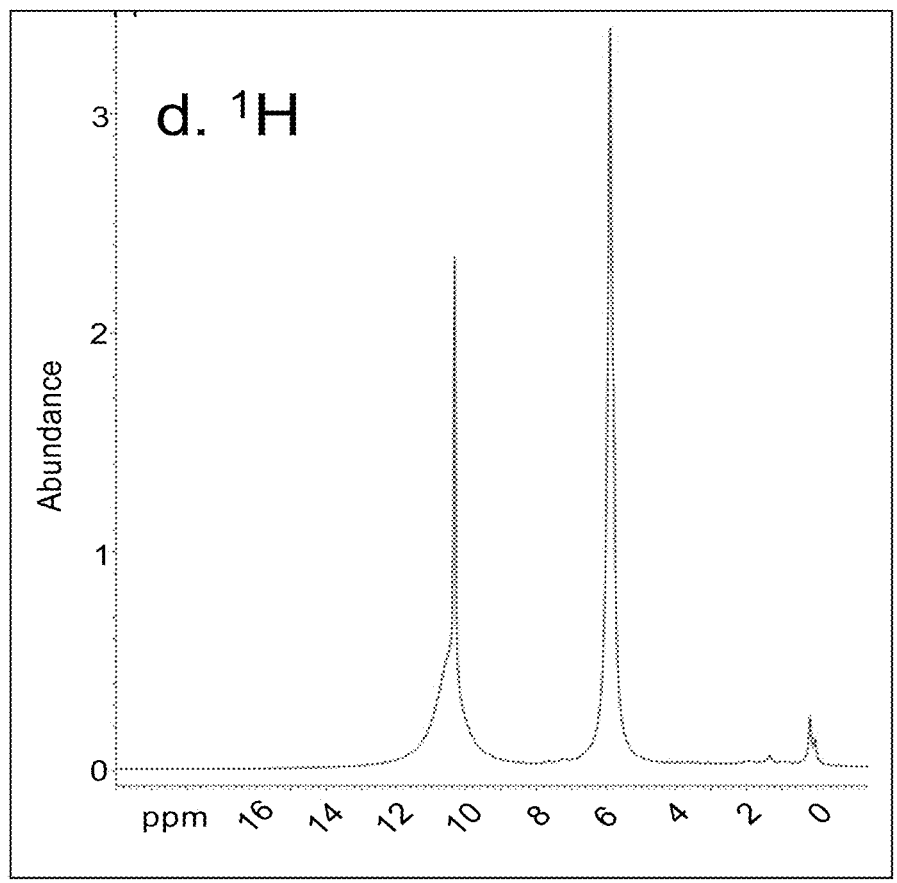
Figure 4E:
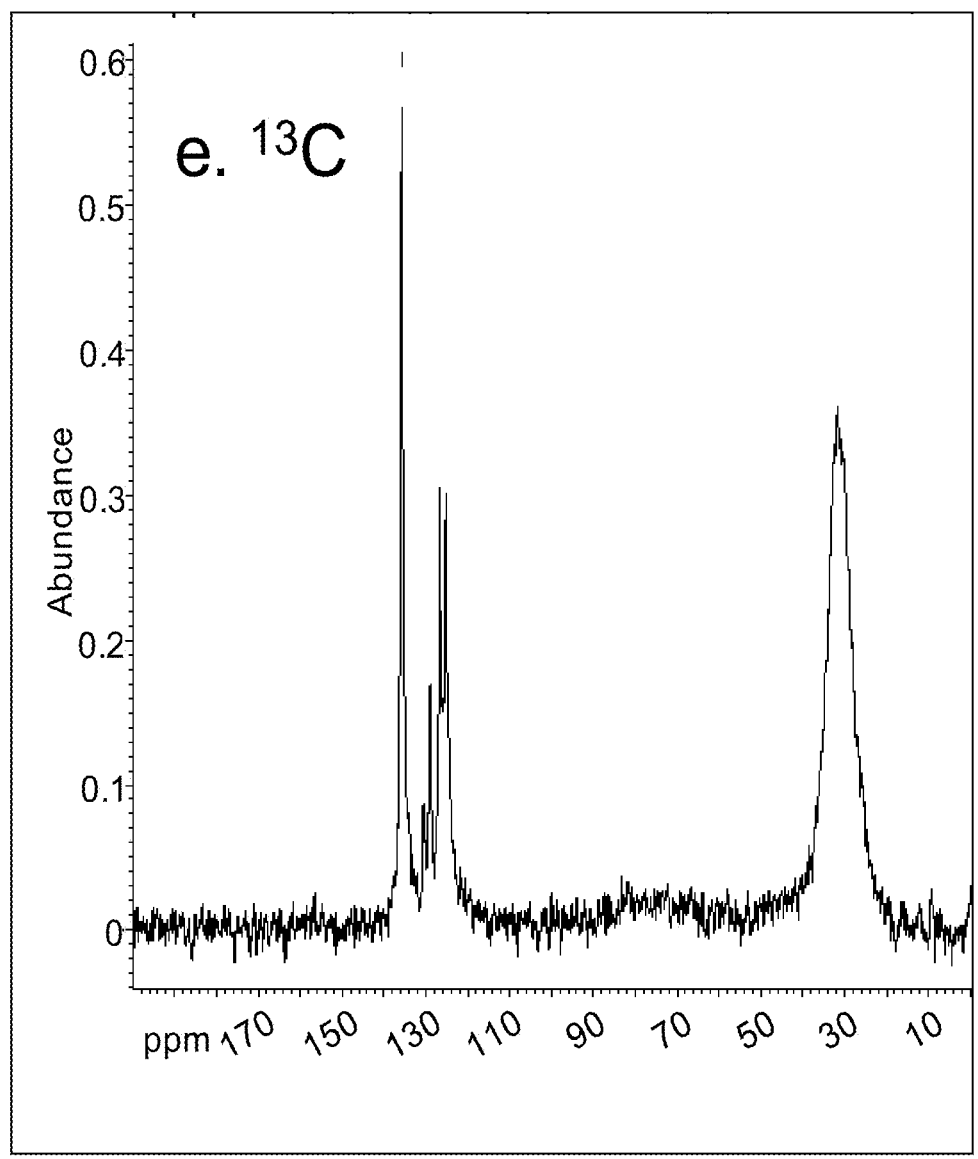
Figure 4F:
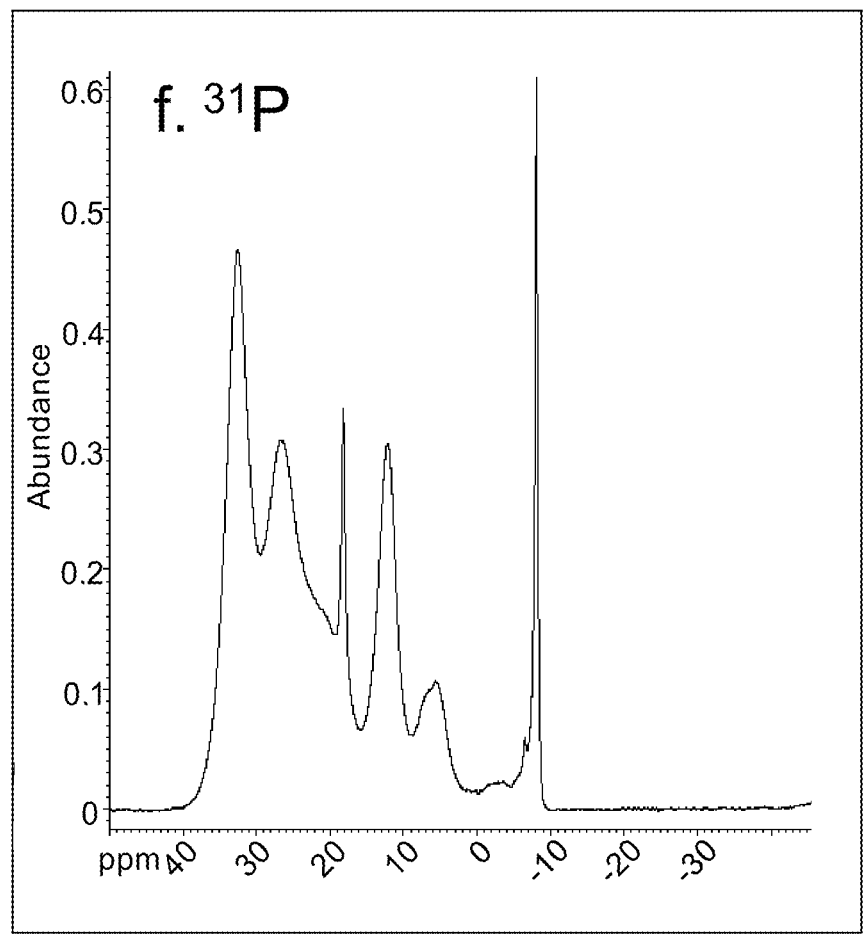

FIGS. 4A-4F depict $^1$H, $^{31}$P and $^{13}$C solid state charge polarized magic angle spinning nuclear magnetic resonance spectra of zirconium phosphate (FIGS. 4A-4C) and of a composition 20 wt % zirconium phosphate and 80 wt % vinyl phosphonic acid (FIGS. 4D-4F). The magnetic resonance spectra were collected on a JEOL JNM-ECA500 spectrometer.

While not wanting to be bound by any theory, the complexity of $^{31}$P, $^{13}$C and $^1$H magnetic resonance spectra of the composition compared to zirconium phosphate is substantially consistent with zirconium contained with the zirconium phosphate chemically interacting with phosphonic acid group of the vinyl phosphonic acid. More specifically, the magnetic resonance spectra are substantially consistent with zirconium chemically interacting with phosphonic acid group when the zirconium phosphate is mixed with the vinyl phosphonic acid and before polymerization of the vinyl phosphonic acid. Furthermore, the infrared are substantially consistent with a chemical interaction of the zirconium with the phosphonic acid group prior to vinyl polymerization.

The zirconium phosphate proton, $^1$H, spectrum has broad singlet peaks at about 5 and 10 ppm (FIG. 4A). The photon spectrum (FIG. 4D) for the composition has sharp, strong acidic singlet proton peaks at about 5.5 and 10 ppm (spectra d). The sharp, strong singlet at about 10 ppm is characteristic of a proton conductor. The zirconium phosphate carbon-13 magnetic resonance spectrum (FIG. 4B) has two sharp singlet peaks at about 129 and 130 ppm. The composition $^{13}$C spectrum generally has less sharp, that is broader singlet peaks at about 129 and 130 ppm than the zirconium phosphate. Furthermore, the composition has an additional $^{13}$C signal at about 30 ppm. While not wanting to be bound by any theory, it is believed that the broader 129 and 130 ppm bands and the additional singlet at about 30 ppm in the composition are due to one or more of rearrangements and anisotropy in the composition due to zirconium phosphate interactions with the phosphonic group of the vinyl phosphonic acid. The vinyl phosphonic acid $^{31}$P magnetic resonance spectrum (FIG. 4C) has a sharp singlet at about −10 ppm. The $^{31}$P spectrum for the composition similarly has a sharp singlet at about −10 ppm. However, the $^{31}$P spectrum of the composition has a multiplicity of board peaks with splitting from about 5 to about 30 ppm (FIG. 4F). While not wanting to be bound by any theory, it is believed that these additional peaks at about 5 to about 30 ppm in the $^{31}$P spectrum of the composition (FIG. 4F), compared to zirconium phosphate (FIG. 4C), are believed to be due to one or more of rearrangements, anisotropy or various phosphorous environments in the composition due to zirconium interactions with the phosphorous-containing phosphonic and phosphate groups.

Figure 5:
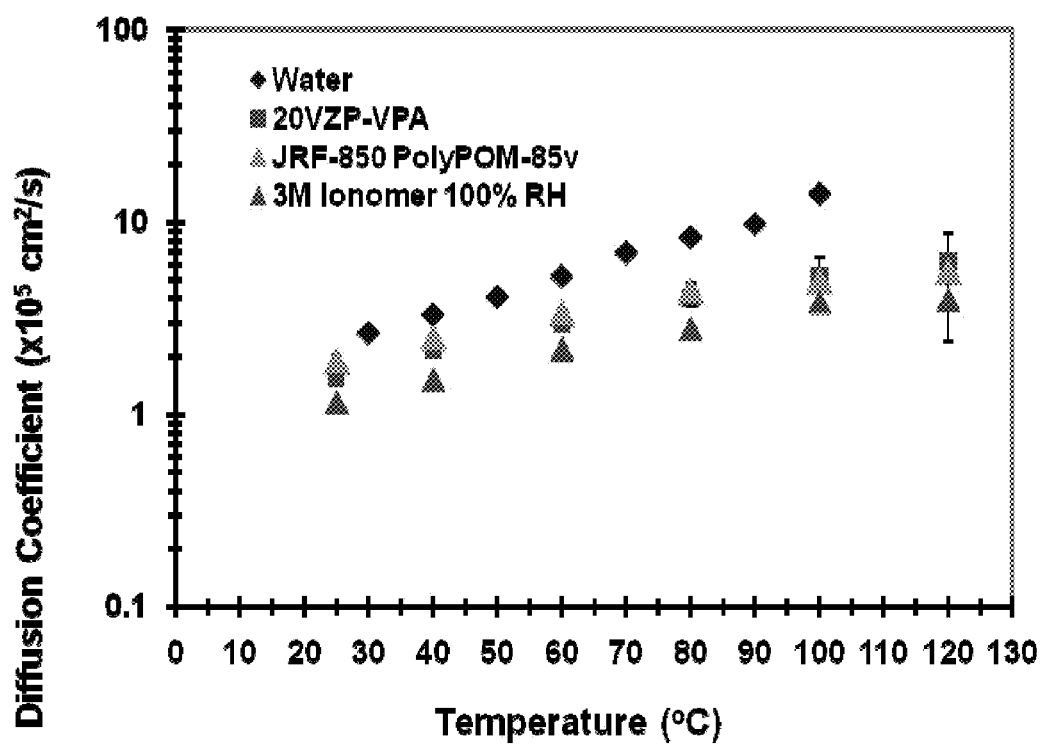
FIG. 5 depicts diffusion coefficients for water compositions according to some embodiments and two controls JRF-850 PolyPOM-85V (triangle shape a) and 3M ionomer at 100% relative humidity (triangle shape b)

FIG. 5 depicts diffusion coefficients for water (diamond shape), a composition comprising about 20 wt % zirconium phosphate and about 80 wt % vinyl phosphonic acid (square shape) and two controls JRF-850 PolyPOM-85V (triangle shape a) and 3M ionomer at 100% relative humidity (triangle shape b). The diffusion coefficients were determined by pulsed field gradient spin-echo nuclear magnetic resonance spectroscopy. The pulsed field gradient spin-echo magnetic resonance measured proton, $^1$H, diffusion through a membrane using a 5-mm Doty Scientific, Inc. #20-40 z-gradient pulsed field gradient nuclear magnetic resonance probe using a stimulated echo pulse sequence. The magnetic resonance spectra were recorded as a function of gradient pulse current using a 90° radio frequency excitation pulse of 6.5 μs, a gradient pulse width of 1.0 ms and a gradient pulse spacing of 3.2 ms. In order to minimize eddy currents generated by switching the gradient pulses on and off, a trapezoidal gradient pulse shape with a ramping time of 0.5 ms was used. The gradient coil was calibrated using water at 25.0 degrees Celsius. The gradient coil had a strength of 19 Gauss cm$^{-1}$ A$^{-1}$. Spectra were recorded for 20 equally spaced values of gradient coil currents. The resulting NMR spectra were integrated and fit to a Gaussian function using Spinsight® software available from Varian, Inc. The temperature of the sample was calibrated using a type-T thermocouple inserted into a sample of alumina in the magnetic resonance probe. To maintain steady hydration at 100% relative humidity, samples were sealed in the magnetic resonance tube under vacuum and with a sufficient amount of water. A gap of about 27 mm between the bottom of the magnetic resonance tube and the lower portion of the sample permitted the sample to be placed in the magnetic resonance spectrometer while minimizing the magnetic resonance signal of the water.

The pulsed field gradient spin echo analysis determines the number of water molecules present per proton, thereby providing insight into water swelling and uptake properties of the composition, more specifically of proton diffusion in a membrane comprising the composition. Furthermore, the spin echo analysis can provide insight into the temperature dependence of the water swelling and uptake properties the composition. The pulsed field gradient spin echo analysis showed a substantially linear water uptake from about 30% to about 70% relative humidity. Above about 70% relative humidity the water uptake is substantial, that is, the composition swells and/or resembles a gel.

Proton diffusion properties of the composition were determined by pulsed field gradient $^1$H spin echo proton diffusion analysis (FIG. 5). The spin echo measurements show greater proton diffusion for the composition than currently commercially available ion exchange membranes, such as perflorinated sulfonic acid membranes. Furthermore, the diffusion analysis shows proton diffusion increases with increases in temperature. This increase in photon diffusion with temperature measured for the composition by spin echo proton diffusion differs from the slight decrease in conductivity determined by electrochemical impedance spectroscopy (FIGS. 6A-6F). While not wanting to be bound by any theory, it is believed that the composition remains substantially hydrated during the pulsed filed gradient spin echo analysis, while during the high temperature electrochemical impedance spectroscopy analysis the composition may become partially dehydrated. A less hydrated composition is believed to be less conductive than a more hydrated composition. More specifically, a dehydrated composition is believed to be less conductive than a hydrated composition.

The diffusion coefficients for the composition comprising about 20 wt % zirconium phosphate and about 80 wt % vinyl phosphonic acid (square shape) were substantially high. More specifically, the diffusion coefficient for the composition was substantially greater than the 3M ionomer control at 100% relative humidity and about equal to or greater than the JRF-850 PolyPOM-85v control. The composition having about 20 wt % zirconium phosphate and about 80 wt % vinyl phosphonic acid had a diffusion coefficient from about 1.5× 10$^5$ cm$^2$s$^{-1}$ at about 25 degrees Celsius to about 5×10$^5$ cm$^2$s$^{-1}$ at about 120 degrees Celsius. These high diffusion coefficients for the composition are substantially consistent with fast proton diffusion.

FIGS. 6A-6E depict conductivity for various compositions according to embodiments, the conductivity of the compositions was determined by an electrochemical impedance spectroscopy analysis of the compositions. Membranes comprising the composition were cast by placing the composition between two sheets of silicon-treated mylar and then drawing down mechanically to thin layer. This layer was then passed under a strong UV lamp to initiate polymerization. The membranes had a thickness from about 20 m to about 140 m, a width from about 1 to about 2 mm and a length of about 38 mm. The electrode electrochemical impedance cell comprised a four-electrode test cell. The electrochemical impedance determinations were conducted in TestEquity environment chamber, the environment chamber allowed for temperature and relative humidity control during the electrochemical impedance determinations. The electrochemical impedance data were generated and collected by EC-labs software. The electrodes comprise four platinum wires, the outer two electrodes further include a small amount to platinum gauze. The electrochemical impedance cell further includes a sufficient source of protons to assure that conductivity is not limited by the availability of protons. The platinum gauze sufficiently provides enough protons. Conductivity is measured in-plane with the casting of the membrane, between the two-inner electrodes.

Figure 6A:
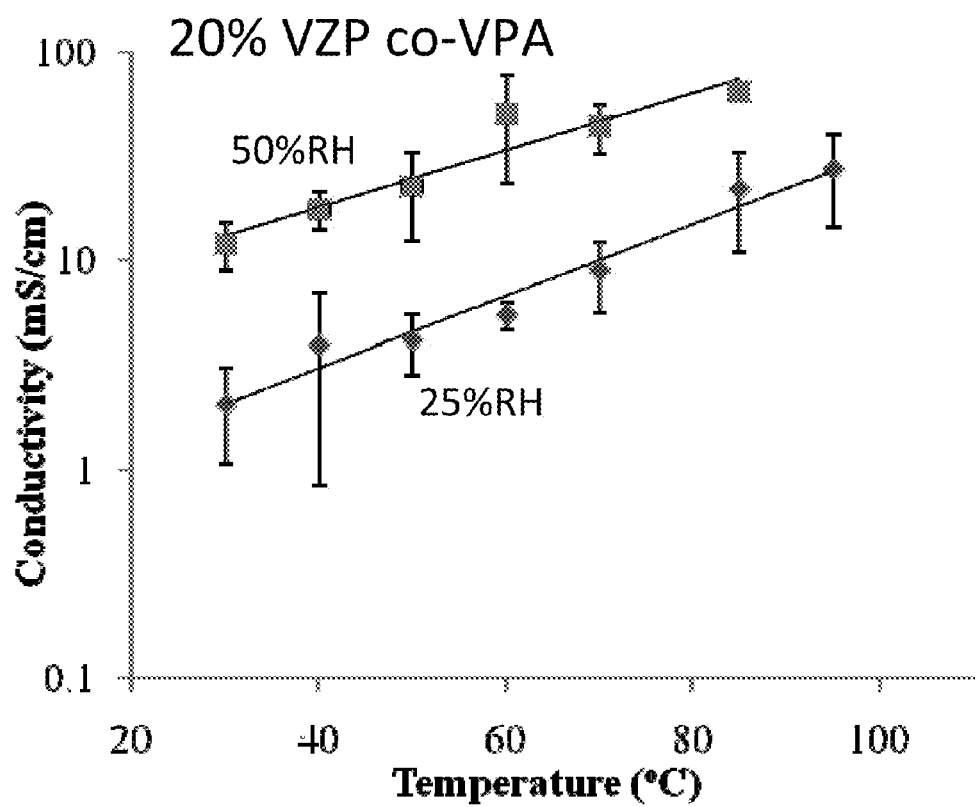
FIGS. 6A-6E depict conductivities of compositions according to some embodiments.

FIG. 6A depicts the conductivity for a composition comprising about 20 wt % zirconium phosphate and about 80 wt % vinyl phosphonic acid for temperatures from about 40 to about 100 degrees Celsius at relative humidity values of about 25% and about 50%. The conductivities at a relative humidity of about 50% are great than the conductivities at about 25% for any given temperature. It is believed that at higher relative humidity values the composition is more hydrated. The higher level of hydration of the composition can increase the conductivity.

Figure 6B:
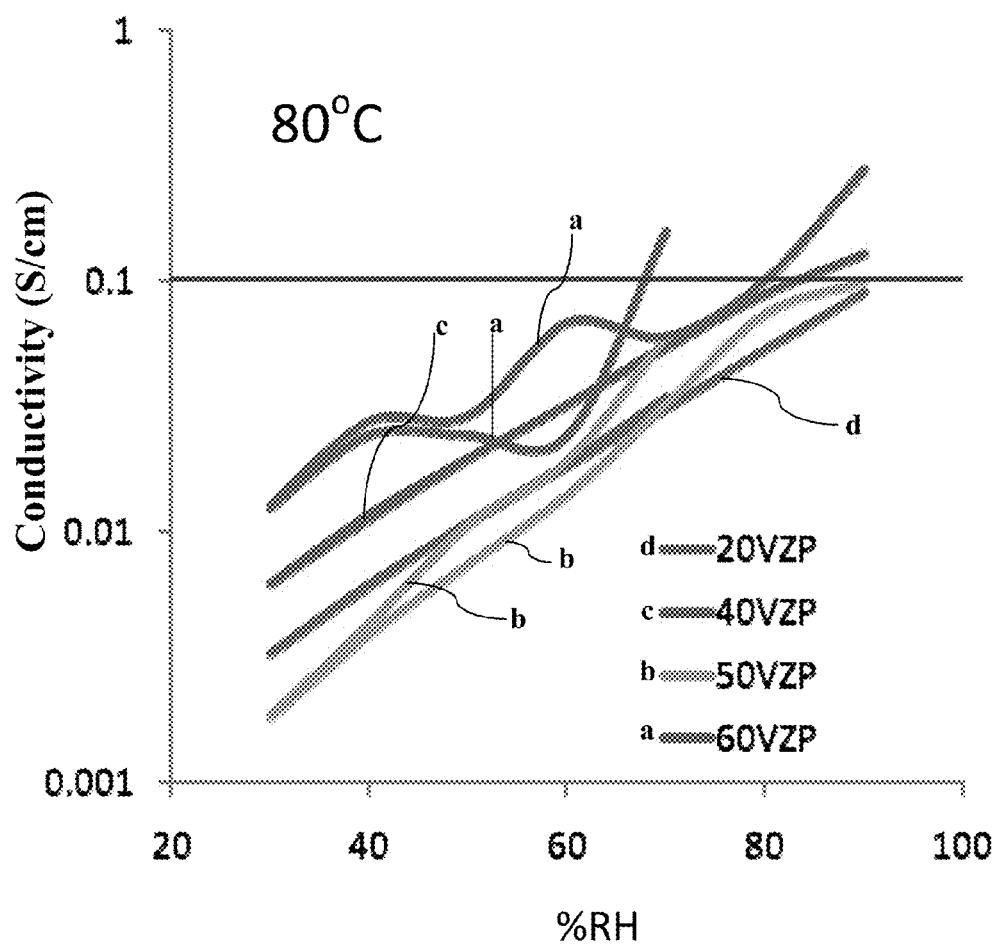

FIG. 6B depicts the conductivities for various compositions at a relative humidity from about 30% to about 90% at a temperature of about 80 degrees Celsius. The compositions depicted in FIG. 6B are about 20 wt % zirconium phosphate and about 80 wt % vinyl phosphate; about 40 wt % zirconium phosphate and about 60 wt % vinyl phosphate; about 50 wt % zirconium phosphate and about 50 wt % vinyl phosphate; and about 60 wt % zirconium phosphate and about 40 wt % vinyl phosphate. The conductivities generally increase with increasing relative humidity. As in FIG. 6A, at the higher relative humidity values the composition is more hydrated, which can increase the conductivity of the composition.

Figure 6C:
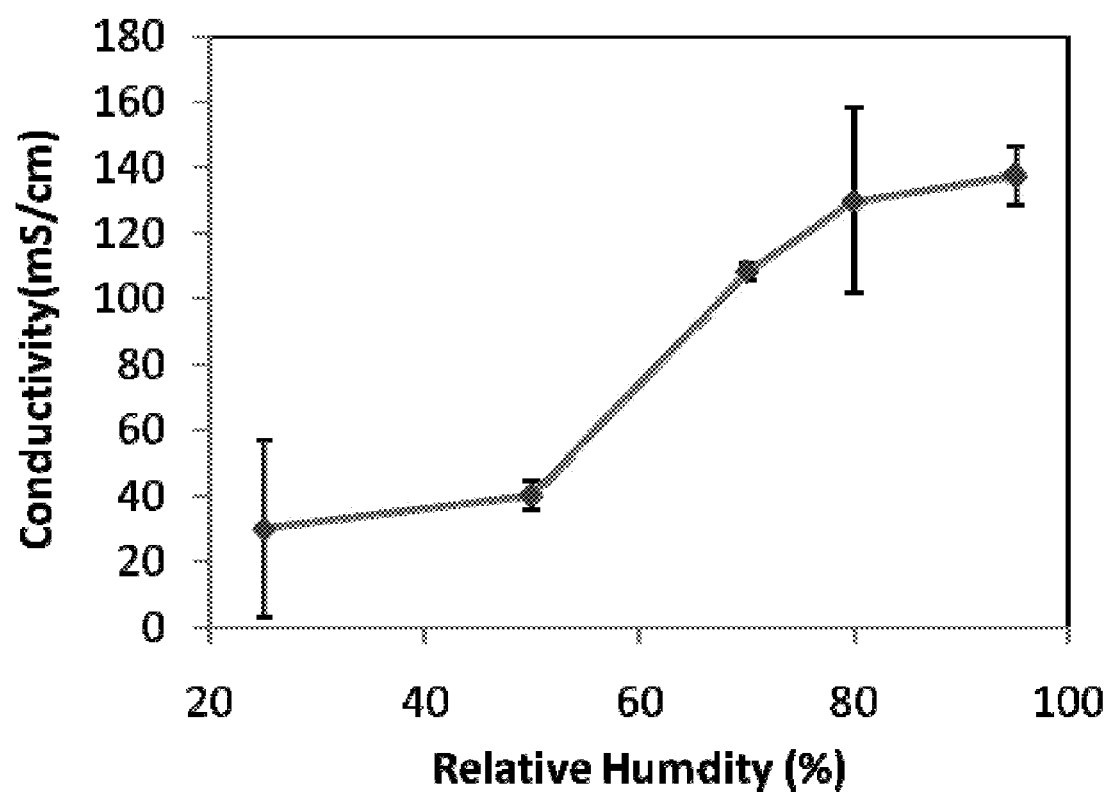
Figure 6D:
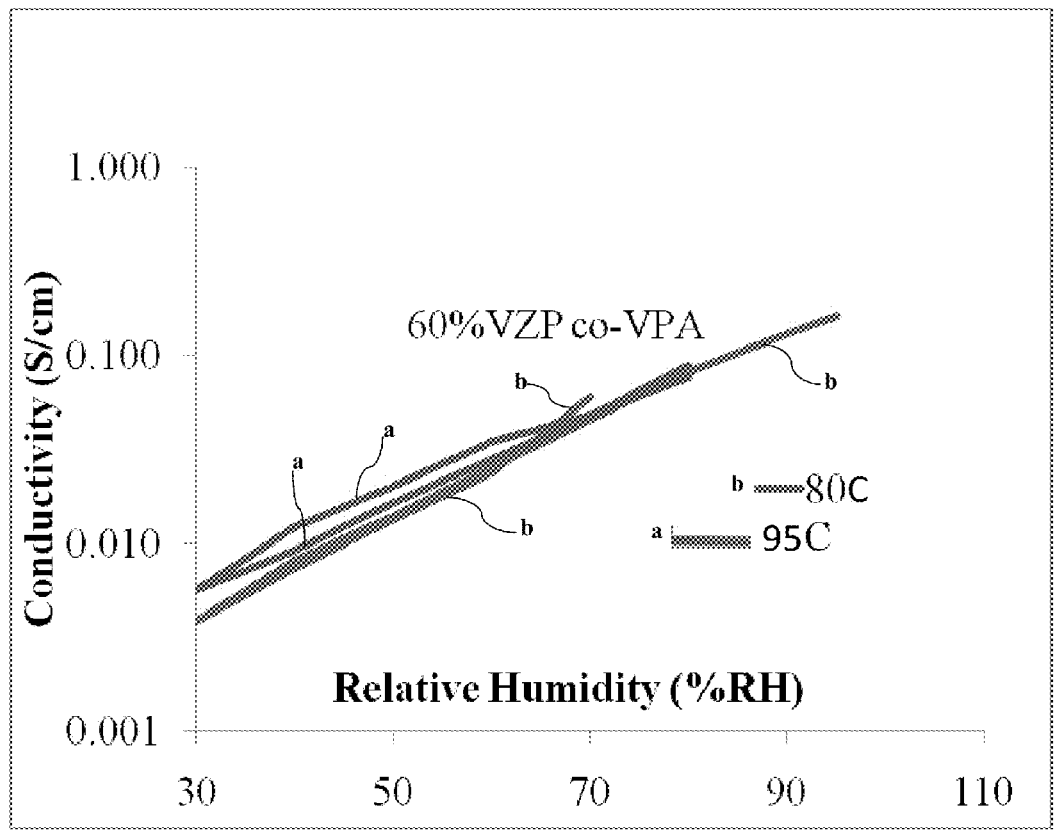
Figure 6E:
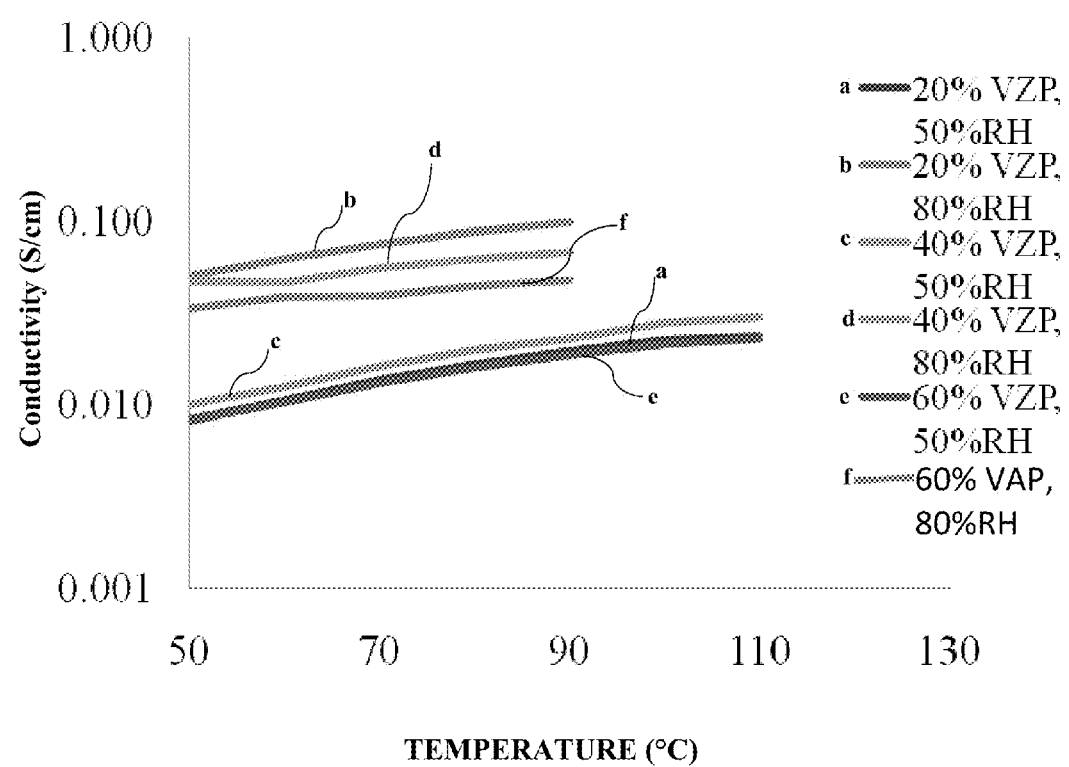

FIG. 6C depicts an increase in conductivity for a typical composition having about 20 wt % zirconium phosphate and about 80 wt % vinyl phosphonic acid with an increase in relative humidity FIG. 6D depicts an increase in conductivity of a composition having about 60 wt % zirconium phosphate and 40 wt % vinyl phosphonic acid at a temperature of about 80 degrees Celsius and relative humidity values from about 30% to about 95%. The compositions had conductivities of about 0.003 S/cm to about 0.1 S/cm. As in FIGS. 6A-6C, conductivity increased with increases in the relative humidity value. The increase in conductivity is believed to be due to the composition being more hydrated at the higher relative humidity values.

FIG. 6F depicts the conductivities for various compositions at relative humidity values of about 50% and 80% at a temperature of from about 50 to about 110 degrees Celsius. The compositions depicted in FIG. 6B are about 20 wt % zirconium phosphate and about 80 wt % vinyl phosphate; about 40 wt % zirconium phosphate and about 60 wt % vinyl phosphate; and about 60 wt % zirconium phosphate and about 40 wt % vinyl phosphate. The conductivities at about 80% relative humidity are greater than the conductivities at about 50% relative humidity. For the compositions evaluated the relative humidity had a greater affect on the conductivity of the composition than either temperature or composition.

A thermogravimetric analysis of the membrane showed a 5% weight loss at about 290 degrees Celsius, indicating some degree of thermal instability at about 290 degrees Celsius.

Figure 7:
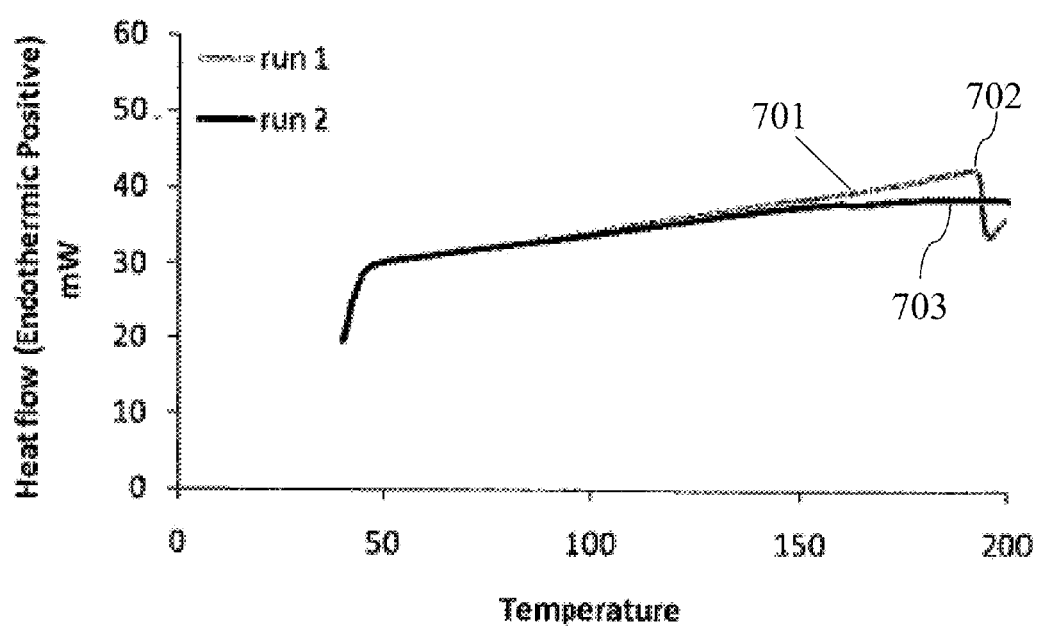
FIG. 7 depicts differential scanning calorimetry scans for a composition according to an embodiment.

FIG. 7 depicts two differential scanning calorimetry curves for a composition comprising about 80 wt % vinyl phosphonic acid and about 20 wt % vinyl zirconium phosphate. Each scan was conducted from about 40 degrees Celsius to about 200 degrees Celsius. The differential scanning calorimetry scan 701 shows a small exothermic peak 702 at about 180 degree Celsius. While not wanting to be bound by any theory, the small peak 702 a is believed to be indicative of a further polymerization reaction and/or structural rearrangement of the ionic membrane (such as, due to water loss) during the differential calorimetry scan. The second differential calorimetry scan (scan 703) lacks an exothermic peak at about 180 degrees Celsius, believed to be indicative of a thermal stable composition. The thermal stability of the composition is maintained to at least about 200 degrees Celsius. Preferably, the composition is substantially stable to a temperature of at least about 200 degrees Celsius.

Figure 8:
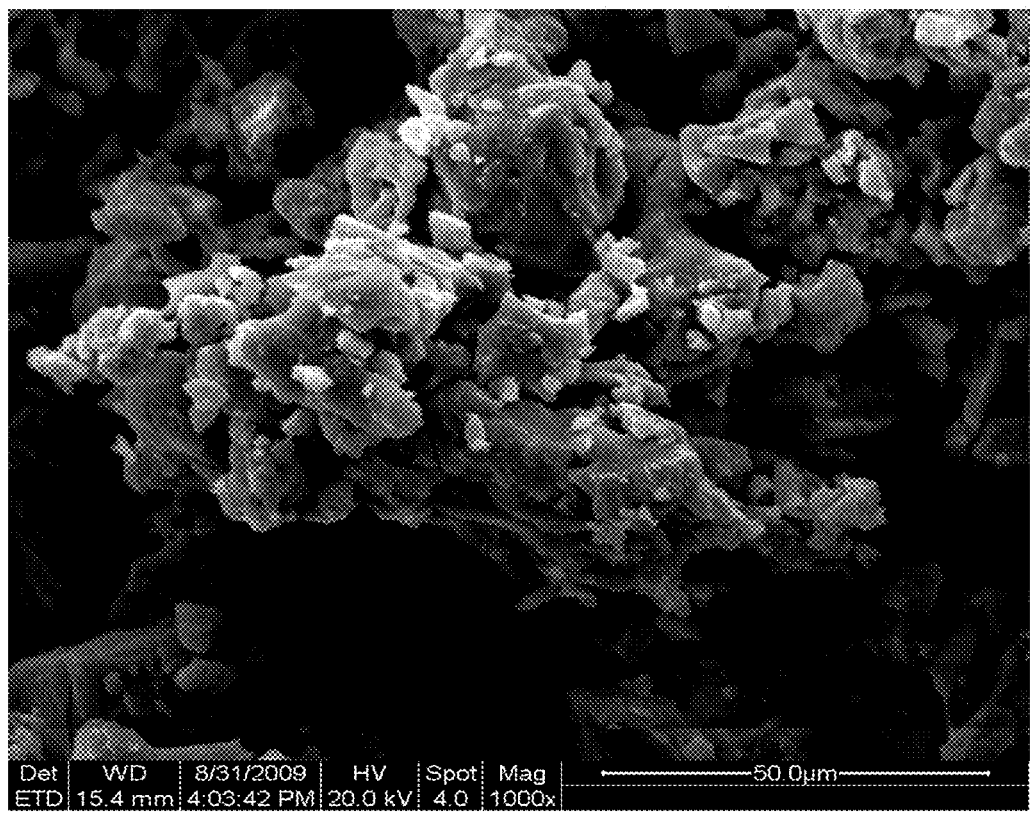
FIG. 8 depicts a scanning electron micrograph according to an embodiment.

FIG. 8 is a scanning electron microscope image of vinyl-functionalized zirconium phosphate. The electron micrograph shows the zirconium phosphate is in a particulate form. The particulates having a particle size of from about 5 μm to about 100 μm.

A number of variations and modifications of the invention can be used. It would be possible to provide for some features of the invention without providing others.

The present invention, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition, comprising:
vinyl phosphonic acid and vinyl zirconium phosphonate, wherein the vinyl phosphonic acid and the vinyl zirconium phosphonate are polymerized through their respective vinyl groups and at least some oxygen of the vinyl phosphonic acid is chemically bonded to zirconium of the vinyl zirconium phosphonate and wherein the composition comprises agglomerates of zirconium phosphonate.

2. The composition of claim 1, wherein the vinyl zirconium phosphonate is from about 15 to about 70 weight percent of the composition and wherein the vinyl phosphonic acid is from about 85 to about 30 weight percent of the composition.

3. The composition of claim 1, wherein the composition is in the form of a membrane.

4. The composition of claim 3, wherein the membrane is one or both of substantially clear and substantially flexible.

5. The composition of claim 3, wherein the membrane has some amorphous regions.

6. The composition of claim 1, wherein the composition is thermally stable to a temperature of at least about 200 degrees Celsius.

7. The composition of claim 1, wherein the composition has one or both of:
i) a conductivity of at least about 150 mS/cm at about 80 degrees Celsius and about 95% relative humidity; and
ii) a conductivity of at least about 100 mS/cm at about 110 degrees Celsius and 25% relative humidity.

8. The composition of claim 7, wherein the conductivity at about 110 degrees Celsius and a relative humidity of about 25% is at least about 40 mS/cm.

9. The composition of claim 1, wherein the composition comprises no more than about 20 weight percent zirconium phosphonate.

10. The composition of claim 1, wherein the agglomerates of zirconium phosphonate are crystalline.

11. The composition of claim 10, wherein the composition comprises at least about 40 weight percent vinyl zirconium phosphonate.

12. The composition of claim 1, wherein the composition has a conductivity of at least about 50 mS/cm at temperature of at least about 25 degrees Celsius and a relative humidity of at least about 25%.

13. A membrane, comprising:
polymerized vinyl phosphonic acid and vinyl zirconium phosphonate cross-linked with zirconium; and
agglomerates of zirconium phosphonate dispersed within the membrane.

14. The membrane of claim 13, wherein the membrane has a conductivity of at least about 1 mS/cm at temperature of at least about 20 degrees Celsius and a relative humidity of about 25%.

15. The membrane of claim 13, wherein the vinyl zirconium phosphonate is from about 20 to about 60 weight percent of the membrane and wherein the vinyl phosphonic acid is from about 80 to about 40 weight percent of the membrane.

16. The membrane of claim 13, wherein the membrane is thermally stable to a temperature of at least about 200 degrees Celsius.

17. The membrane of claim 13, wherein the membrane has a conductivity of at least about 50 mS/cm at temperature of at least about 25 degrees Celsius and a relative humidity of at least about 25%.

18. The membrane of claim 13, wherein the agglomerates of zirconium phosphonate are crystalline.

19. The membrane of claim 13, wherein the agglomerates of zirconium phosphonate are dispersed in amorphous regions of the membrane.

20. A method for making a composition, comprising:
contacting a first portion of vinyl phosphonic acid and zirconyl chloride to form vinyl zirconium phosphonate; and
polymerizing at least some the vinyl zirconium phosphonate with a second portion of vinyl phosphonic acid, wherein the polymerizing step includes polymerizing some vinyl groups of the vinyl zirconium phosphonate with some vinyl groups of the vinyl phosphonic acid and cross-linking at least some phosphonic acid of the vinyl phosphonic acid with some zirconium of the vinyl zirconium phosphonate to form a polymerized vinyl phosphonic acid.

21. The method of claim 20, wherein the polymerizing of the vinyl phosphonic acid is selected from the group of polymerizing processes consisting of: free radical, anionic, step polymerization, and cationic.

22. The method of claim 20, wherein the polymerizing process is initiated by an initiator.

23. The method of claim 22, wherein the initiator is selected from the group consisting of an organic molecule, a non-metal containing molecule, a metal, a metal-containing molecule, a redox initiator, ultra violet light, electron beam, x-ray beam, electro-magnetic energy, thermal energy and a combination thereof.

24. The method of claim 20, wherein the composition has a conductivity of at least about 50 mS/cm at temperature of at least about 25 degrees Celsius and a relative humidity of at least about 25%.

25. A composition, comprising:
vinyl phosphonic acid; and
zirconium phosphate, wherein at least some vinyl groups of the vinyl phosphonic acid and some vinyl groups of the vinyl zirconium phosphonate are polymerized, wherein at least some zirconium chemically interacts with at least some of the oxygen atoms comprising the vinyl phosphonic acid and the vinyl zirconium phosphonate to cross-link at least some of the vinyl phosphonic acid with the vinyl zirconium phosphonate and wherein the composition has a conductivity of at least about 10 mS/cm at about 25 degrees Celsius and a relative humidity of about 25%.

26. The composition of claim 25, wherein the composition the conductivity of the composition is at least about 150 mS/cm at about 80 degrees Celsius and about 95% relative humidity.

27. The composition of claim 25, wherein the composition the conductivity of the composition is at least about 100 mS/cm at about 110 degrees Celsius and about 25% relative humidity.

28. The composition of claim 25, wherein the vinyl zirconium phosphonate comprises from about 15 to about 70 weight percent of the composition and wherein the vinyl phosphonic acid comprises from about 85 to about 30 weight percent of the composition.

29. The composition of claim 25, wherein the composition is in the form of membrane and wherein the membrane is one or both of substantially clear and substantially flexible.

30. The composition of claim 25, wherein the composition has at least some amorphous regions, and wherein the composition comprises crystalline agglomerates of zirconium phosphonate.

31. The composition of claim 25, wherein the conductivity of the composition is at least about 50 mS/cm at temperature of at least about 25 degrees Celsius and a relative humidity of at least about 25%.

* * * * *